US008862292B2

(12) United States Patent
Cooper

(10) Patent No.: US 8,862,292 B2
(45) Date of Patent: Oct. 14, 2014

(54) CONTROL SYSTEM AND METHOD FOR REMOTELY ISOLATING POWERED UNITS IN A VEHICLE SYSTEM

(71) Applicant: General Electric Company, Schenectady, NY (US)

(72) Inventor: Jared Klineman Cooper, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/840,656

(22) Filed: Mar. 15, 2013

(65) Prior Publication Data

US 2013/0200222 A1 Aug. 8, 2013

Related U.S. Application Data

(63) Continuation-in-part of application No. 12/556,334, filed on Sep. 9, 2009, now Pat. No. 8,538,608.

(51) Int. Cl.
*B61C 17/12* (2006.01)
*B61L 15/00* (2006.01)
*B61L 3/00* (2006.01)

(52) U.S. Cl.
CPC ............ *B61C 17/12* (2013.01); *B61L 15/0063* (2013.01); *B61L 3/002* (2013.01); *B61L 15/0027* (2013.01); *Y02T 30/10* (2013.01); *B61L 3/006* (2013.01)
USPC ........................................ 701/19; 246/187 C

(58) Field of Classification Search
CPC . B61C 17/12; B61L 15/0072; B61L 15/0063; B61L 15/0018; B61L 15/0036; B61L 15/0027; B61L 3/006; B60L 15/38; Y02T 30/10
See application file for complete search history.

(56) References Cited

U.S. PATENT DOCUMENTS

| 4,360,873 | A | * | 11/1982 | Wilde et al. ............... 246/187 C |
| 8,645,047 | B2 | * | 2/2014 | Daum et al. ................... 701/110 |
| 2007/0233364 | A1 | * | 10/2007 | Kumar .......................... 701/200 |
| 2008/0147256 | A1 | * | 6/2008 | Liberatore ....................... 701/19 |
| 2008/0201028 | A1 | * | 8/2008 | Brooks et al. ................... 701/20 |
| 2010/0049384 | A1 | * | 2/2010 | Kraeling et al. ................ 701/20 |

* cited by examiner

Primary Examiner — Michael J Zanelli
(74) Attorney, Agent, or Firm — GE Global Patent Operation; John A. Kramer

(57) ABSTRACT

A method includes obtaining motive outputs demanded by a trip plan for a vehicle system having interconnected propulsion-generating vehicles, determining motive output capabilities of the propulsion-generating vehicles, and identifying segments of the trip where the motive output capabilities of the propulsion-generating vehicles exceed motive outputs demanded by the trip plan over the segments. The method further includes selecting one or more of the propulsion-generating vehicles for turning at least one of off or to idle in the one or more segments while one or more remaining propulsion-generating vehicles in the vehicle system remain on. The propulsion-generating vehicles are selected such that a total motive output capability of the one or more remaining propulsion-generating vehicles remains at least as great as the motive outputs demanded by the trip plan over the one or more segments.

21 Claims, 9 Drawing Sheets

CONTROL SYSTEM AND METHOD FOR REMOTELY ISOLATING POWERED UNITS IN A VEHICLE SYSTEM

CROSS-REFERENCE TO RELATED APPLICATIONS

This application is a continuation-in-part of U.S. application Ser. No. 12/556,334, which was filed on 9 Sep. 2009, and also is titled "Control System And Method For Remotely Isolating Powered Units In A Rail Vehicle System," the entire disclosure of which is incorporated by reference.

FIELD

The inventive subject matter described herein relates generally to powered vehicle systems.

BACKGROUND

Known powered rail vehicle systems include one or more powered units and, in certain cases, one or more non-powered rail cars. The powered units supply tractive force to propel the powered units and cars. The non-powered cars hold or store goods and/or passengers. ("Non-powered" rail car generally encompasses any rail car without an on-board source of motive power.) For example, some known powered rail vehicle systems include a rail vehicle system (e.g., train) having locomotives and cars for conveying goods and/or passengers along a track. Some known powered rail vehicle systems include several powered units. For example, the systems may include a lead powered unit, such as a lead locomotive, and one or more remote or trailing powered units, such as trailing locomotives, that are located behind and (directly or indirectly) coupled with the lead powered unit. The lead and remote powered units supply tractive force to propel the vehicle system along the track.

The tractive force required to convey the powered units and cars along the track may vary during a trip. For example, due to various parameters that change during a trip, the tractive force that is necessary to move the powered units and the cars along the track may vary. These changing parameters may include the curvature and/or grade of the track, speed limits and/or requirements of the system, and the like. As these parameters change during a trip, the total tractive effort, or force, that is required to propel the vehicle system along the track also changes.

While the required tractive effort may change during a trip, the operators of these powered rail vehicle systems do not have the ability to remotely turn the electrical power systems of remote powered units on or off during the trip. For example, an operator in a lead locomotive does not have the ability to remotely turn one or more of the trailing locomotives' electrical power on or off, if the tractive effort required to propel the train changes during a segment of the trip while the rail vehicle system is moving. Instead, the operator may only have the ability to locally turn on or off the remote powered units by manually boarding each such unit of the rail vehicle system.

Some known powered rail vehicle systems provide an operator in a lead locomotive with the ability to change the throttle of trailing locomotives (referred to as distributed power operations). But, these known systems do not provide the operator with the ability to turn the trailing locomotives off. Instead, the operator must turn down the throttle of the trailing locomotives that he or she wants to turn off and wait for an auto engine start/stop (AESS) device in the trailing locomotives to turn the locomotives off. Some known AESS devices do not turn the trailing locomotives off until one or more engine- or motor-related parameters are within a predetermined range. For example, some known AESS devices may not shut off the engine of a trailing locomotive until the temperature of the engine decreases to a predetermined threshold. If the time period between the operator turning down the throttle of the trailing locomotives and the temperature of the engines decreasing to the predetermined threshold is significant, then the amount of fuel that is unnecessarily consumed by the trailing locomotives can be significant.

BRIEF DESCRIPTION

In an embodiment, a method includes obtaining motive outputs demanded by a trip plan for a vehicle system. The vehicle system includes plural interconnected propulsion-generating vehicles and the trip plan designates operational settings for the vehicle system to operate according to during travel of the vehicle system along one or more routes for a trip. The method also includes determining motive output capabilities of the propulsion-generating vehicles of the vehicle system and identifying one or more segments of the trip where the motive output capabilities of the propulsion-generating vehicles exceed the motive outputs demanded by the trip plan over the one or more segments. The method further includes selecting one or more of the propulsion-generating vehicles for at least one of turning off or for turning to idle during travel in the one or more segments that are identified while one or more remaining propulsion-generating vehicles in the vehicle system remain on to propel the vehicle system through the one or more segments. The one or more propulsion-generating vehicles are selected for turning off or for turning to idle such that a total motive output capability of the one or more remaining propulsion-generating vehicles remains at least as great as the motive outputs demanded by the trip plan over the one or more segments that are identified.

In an embodiment, a control system includes a first unit and a master isolation unit. The first unit is configured to obtain motive outputs demanded by a trip plan for a vehicle system including plural interconnected propulsion-generating vehicles. The trip plan designates operational settings for the vehicle system to operate according to during travel of the vehicle system along one or more routes for a trip. The first unit also is configured to identify one or more segments of the trip where motive output capabilities of the propulsion-generating vehicles exceed the motive outputs demanded by the trip plan and to select one or more of the propulsion-generating vehicles for turning at least one of off or to idle during travel in the one or more segments that are identified. The plural propulsion-generating vehicles of the vehicle system comprise the one or more of the propulsion-generating vehicles that are selected and one or more remaining propulsion-generating vehicles that are not selected. The master isolation unit is configured to receive an isolation command from the first unit that identifies the one or more propulsion-generating vehicles that are selected for being turned at least one of off or to idle during travel in the one or more segments. The master isolation unit also is configured to remotely turn at least one of off or to idle the one or more propulsion-generating vehicles that are identified by the first unit when the vehicle system reaches the one or more segments. The one or more propulsion-generating vehicles are selected by the first unit such that a total motive output capability of the one or more remaining propulsion-generating vehicles remains at least as great as the motive outputs demanded by the trip plan over the one or more segments that are identified.

In an embodiment, a method includes obtaining plural different trip plans that designate operational settings of a vehicle system for travel over one or more routes for a trip. The vehicle system includes plural interconnected propulsion-generating vehicles. A first trip plan of the different trip plans directs the propulsion-generating vehicles to be on for the trip and a second trip plan of the different trip plans directing one or more of the propulsion-generating vehicles to be turned at least one of off or to idle for the trip. The method also includes comparing at least the first and second trip plans with each other to identify at least one segment in the trip where the operational settings designated by the first trip plan overlap the operational settings designated by the second trip plan. The method further includes creating a hybrid trip plan from two or more of the different trip plans. The hybrid trip plan includes the designated operational settings of at least one of the first trip plan or the second trip plan in the at least one segment in the trip.

In an embodiment, a control system for a rail vehicle system including a lead powered unit and a remote powered unit is provided. As used herein, the term "powered unit" means a unit (e.g., a vehicle) that generates tractive effort or power in order to propel the unit. A powered unit also may be referred to as a propulsion-generating unit or vehicle. Conversely, the term "non-powered unit" means a unit (e.g., a vehicle) that does not generate tractive effort or power in order to propel the unit. A non-powered unit also may be referred to as a non-propulsion-generating unit or vehicle. The system includes a user interface, a master isolation module, and a slave controller. The user interface is disposed in the lead powered unit and is configured to receive an isolation command to turn on or off the remote powered unit. The master isolation module is configured to receive the isolation command from the user interface and to communicate an instruction based on the isolation command. The slave controller is configured to receive the instruction from the master isolation module. The slave controller causes the remote powered unit to supply tractive force to propel the rail vehicle system when the instruction directs the slave controller to turn on the remote powered unit. The slave controller causes the remote powered unit to withhold the tractive force when the instruction directs the slave controller to turn off the remote powered unit.

In an embodiment, a method for controlling a rail vehicle system that includes a lead powered unit and a remote powered unit is provided. The method includes providing a user interface in the lead powered unit to receive an isolation command to turn on or off the remote powered unit and a slave controller in the remote powered unit. The method also includes communicating an instruction based on the isolation command to the slave controller and directing the slave controller to cause the remote powered unit to supply tractive force to propel the rail vehicle system when the instruction directs the slave controller to turn on the remote powered unit and to cause the remote powered unit to withhold the tractive force when the instruction directs the slave controller to turn off the remote powered unit.

In an embodiment, a computer readable storage medium for a control system of a rail vehicle system is having a lead powered unit and a remote powered unit is provided. The lead powered unit includes a microprocessor and the remote powered unit includes a slave isolation module and a slave controller. The computer readable storage medium includes instructions to direct the microprocessor to receive an isolation command to turn on or off the remote powered unit. The instructions also direct the microprocessor to communicate an instruction based on the isolation command. The slave controller receives the instruction to cause the remote powered unit to supply tractive force to propel the rail vehicle system when the instruction directs the slave controller to turn on the remote powered unit and to withhold the tractive force when the instruction directs the slave controller to turn off the remote powered unit.

In an embodiment, a method for controlling a train having a lead locomotive and a remote locomotive is provided. The method includes communicating an instruction that relates to an operational state of the remote locomotive from the lead locomotive to the remote locomotive. The method also includes controlling an engine of the remote locomotive at the remote locomotive based on the instruction into one of an on operational state and an off operational state. The engine does not combust fuel during at least a portion of a time period when the engine is in the off operational state.

The control system, method, and computer readable storage medium remotely adjust the tractive force provided by powered units in a powered rail vehicle system by turning powered units in the system on or off. Such a system, method, and computer readable storage medium can improve some known rail vehicle systems by reducing the amount of fuel that is consumed during a trip.

DETAILED DESCRIPTION

Figure 1:
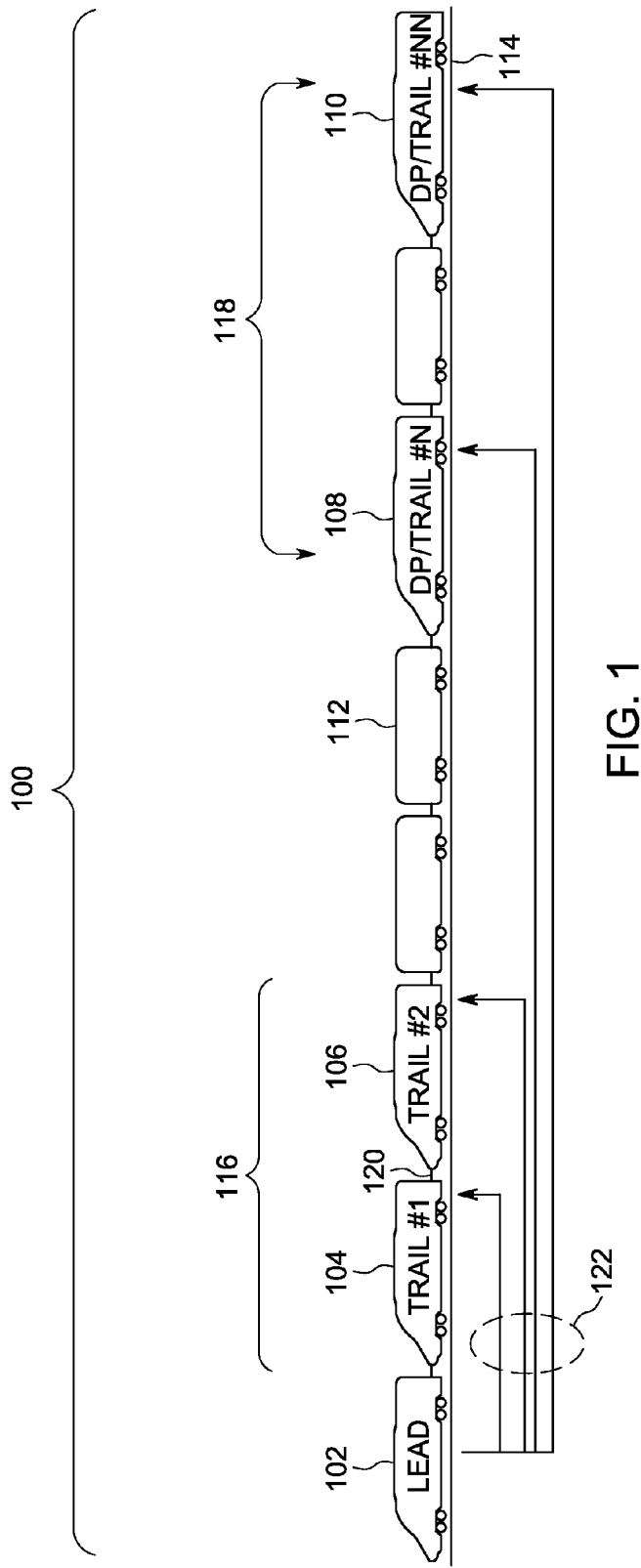
FIG. 1 is a schematic illustration of a rail vehicle system that incorporates an isolation control system constructed in accordance with one embodiment.

The foregoing summary, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It should be noted that although one or more embodiments may be described in connection with powered rail vehicle systems, the embodiments described herein are not limited to trains. In particular, one or more embodiments may be implemented in connection with different types of rail vehicles (e.g., a vehicle that travels on one or more rails, such as single locomotives and railcars, powered ore carts and other mining vehicles, light rail transit vehicles, and the like) and other vehicles. Example embodiments of systems and methods for remotely isolating remote powered units in a rail vehicle system are provided. At least one technical effect described herein includes a method and system that permits an operator in a lead powered unit to remotely turn a remote powered unit on or off FIG. 1 is a schematic illustration of a rail vehicle system 100 that incorporates an isolation control system constructed in accordance with one embodiment. The rail vehicle system 100 includes a lead powered unit 102 coupled with several remote powered units 104, 106, 108, 110 and individual rail cars 112. The rail vehicle system 100 travels along a track 114. The lead powered unit 102 and the remote powered units 104-110 supply a tractive force to propel the rail vehicle system 100 along the track 114. In one embodiment, the lead powered unit 102 is a leading locomotive disposed at the front end of the rail vehicle system 100 and the remote powered units 104-110 are trailing locomotives disposed behind the lead powered unit 102 between the lead powered unit 102 and the back end of the rail vehicle system 100. The individual rail cars 112 may be non-powered storage units for carrying goods and/or passengers along the track 114.

The remote powered units 104-110 are remote from the lead powered unit 102 in that the remote powered units 104-110 are not located within the lead powered unit 102. A remote powered unit 104-110 need not be separated from the lead powered unit 102 by a significant distance in order for the remote powered unit 104-110 to be remote from the lead powered unit 102. For example, the remote powered unit 104 may be directly adjacent to and coupled with the lead powered unit 102 and still be remote from the lead powered unit 102. In one embodiment, the lead powered unit 102 is not located at the front end of the rail vehicle system 100. For example, the lead powered unit 102 may trail one or more individual cars 112 and/or remote powered units 104-110 in the rail vehicle system. Thus, unless otherwise specified, the terms "lead," "remote," and "trailing" are meant to distinguish one rail vehicle from another, and do not require that the lead powered unit be the first powered unit or other rail vehicle in a train or other rail vehicle system, or that the remote powered units be located far away from the lead powered unit or other particular units, or that a "trailing" unit be behind the lead unit or another unit. The number of powered units 102-110 in the rail vehicle system 100 may vary from those shown in FIG. 1.

The remote powered units 104-110 may be organized into groups. In the illustrated embodiment, the remote powered units 104, 106 are organized into a consist group 116. A consist group 116 may include one or more powered units 102-110 that are the same or similar models and/or are the same or similar type of powered unit. For example, a consist group 116 may include remote powered units 104, 106 that are manufactured by the same entity, supply the same or similar tractive force, have the same or similar braking capacity, have the same or similar types of brakes, and the like. The powered units 102-104 in a consist group 116 may be directly coupled with one another or may be separated from one another but interconnected by one or more other components or units.

The remote powered units 108, 110 are organized into a distributed power group 118 in the illustrated embodiment. Similar to a consist group 116, a distributed power group 118 may include one or more powered units 102-110. The powered units 102-110 in a distributed power group 118 may be separated from one another but interconnected with one another by one or more other powered units 102-110 and/or individual cars 112.

In operation, the lead powered unit 102 remotely controls which of the remote powered units 104-110 are turned on and which remote powered units 104-110 are turned off. For example, an operator in the lead powered unit 102 may remotely turn one or more of the remote powered units 104-110 on or off while remaining in the lead powered unit 102. The lead powered unit 102 may remotely turn on or off individual remote powered units 104-110 or entire groups of remote powered units 104-110, such as the remote powered units 104, 106 in the consist group 104-106 and/or the remote powered units 108, 110 in the distributed power group 116. The lead powered unit 102 remotely turns the remote powered units 104-110 on or off when the rail vehicle system 100 is moving along the track 114 and/or when the rail vehicle system 110 is stationary on the track 114.

The remote powered units 104-110 supply tractive forces to propel the rail vehicle system 100 along the track 114 when the respective remote powered units 104-110 are turned on. Conversely, the individual remote powered units 104-110 withhold tractive forces and do not supply a tractive force to propel the rail vehicle system 100 along the track 114 when the respective remote powered units 104-110 are turned off. The lead powered unit 102 may control which of the remote powered units 104-110 are turned on and which of the remote powered units 104-110 are turned off based on a variety of factors. By way of example only, the lead powered unit 102 may turn off some remote powered units 104-110 while leaving other remote powered units 104-110 on if the remote powered units 104-110 that remain on are supplying sufficient tractive force to propel the rail vehicle system 100 along the track 114.

The lead powered unit 102 communicates with the remote powered units 104-110 in order to turn the remote powered units 104-110 on or off. The lead powered unit 102 may communicate instructions to the remote powered units 104-110 via a wired connection 120 and/or a wireless connection 122 between the lead powered unit 102 and the remote powered units 104-110. By way of non-limiting example only, the wired connection 120 may be a wire or group of wires, such as a trainline or MU cables, that extends through the powered units 102-110 and cars 112 of the rail vehicle system 100. The wireless connection 122 may include radio frequency (RF) communication of instructions between the lead powered unit 102 and one or more of the remote powered units 104-110.

Figure 2:
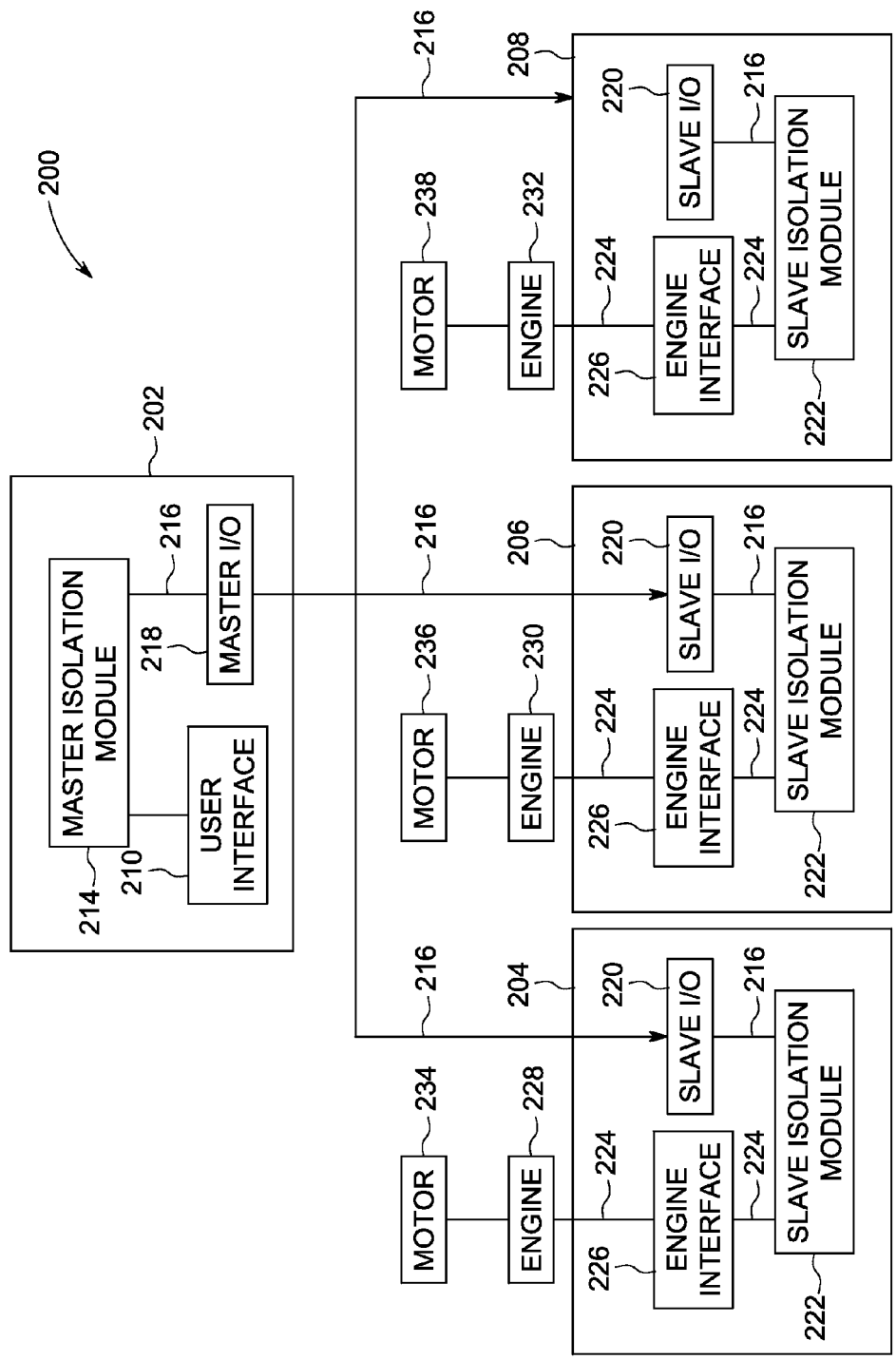
FIG. 2 is a schematic illustration of an isolation control system in accordance with one embodiment.

FIG. 2 is a schematic illustration of the isolation control system 200 in accordance with one embodiment. The isolation control system 200 enables an operator in the lead powered unit 102 (shown in FIG. 1) to remotely change a powered or operational state of one or more of the remote powered units 104-110 (shown in FIG. 1). The powered or operational state of one or more of the remote powered units 104-110 may be an "on" operational state or an "off" operational state based on whether power is supplied to (or by) engines 228-232 of the remote powered units 104-110. For example, a remote powered unit 104 may be turned to an "off" state by shutting off power to the engine 228 in the remote powered unit 104. Depending on the type of engine involved, this may include one or more of the following: communicating with an engine controller or control system that the engine is to be turned off; shutting off a supply of electricity to the engine, where the electricity is required by the engine to operate (e.g., spark plug operation, fuel pump operation, electronic injection pump); shutting off a supply of fuel to the engine; shutting off a supply of ambient air or other intake air to the engine; restricting the output of engine exhaust; or the like. Turning the engine 228-232 of a remote powered unit 104-110 off may prevent the engine 228-232 in the remote powered unit 104-110 from generating electricity. (As should be appreciated, this assumes that the engine output is connected to a generator or alternator, as is common in a locomotive or other powered unit; thus, unless otherwise specified, the term "engine" refers to an engine system including an engine and alternator/generator.) If the engine 228-232 is turned off and does not generate electricity, then the engine 228-232 cannot generate electricity that is fed to one or more corresponding electric motors 234-238 in the remote power units 104-110, and the motors 234-238 may be unable to move the axles and wheels of the remote powered unit 104-110. (In this configuration, common among locomotives and other rail powered units, electric motors are connected to the vehicle axles, via a gear set, for moving the powered unit, while the engine is provided for generating electricity for electrically powering the motors.) In one embodiment, a remote powered unit 104-110 is turned "off" by directing the engine 228-232 in the remote powered unit 104-110 to cease or stop supplying tractive effort. For example, the remote powered unit 104-110 may be turned off by directing the engine 228-232 of the remote powered unit 104-110 to stop supplying electricity to the corresponding motor(s) 234-238 of the remote powered unit 104-110 that provide tractive effort for the remote powered unit 104-110.

In another embodiment, a remote powered unit 104-110 (shown in FIG. 1) may be turned off by completely shutting down the corresponding engine 228-232 of the remote powered unit 104-110. For example, the engine 228-232 may be shut down such that the engine 228-232 is no longer combusting, burning, or otherwise consuming fuel to generate electricity. A remote powered unit 104-110 may be changed to an "off" state by temporarily shutting down the engine 228-232 such that the engine 228-232 is no longer combusting, burning, or otherwise consuming fuel to generate electricity but for periodic or non-periodic and relatively short time periods where the engine 228-232 is changed to an "on" state in order to maintain a designated or predetermined engine temperature. The power that is supplied to the engine 228-232 during the short time periods may be sufficient to cause the engine 228-232 to combust some fuel while being insufficient to enable the engine 228-232 to provide tractive effort to the corresponding remote powered unit 104-110.

In one embodiment, the state of an engine 228-232 of a remote powered unit 104-110 (shown in FIG. 1) is changed to an "off" state when the power that is supplied by the engine 228-232 is reduced below a threshold at which an Automatic Engine Start/Stop (AESS) system assumes control of the powered or operating state of the engine 228-232. For example, the engine 228 of the remote powered unit 104 may be shut off by decreasing the power supplied by the engine 228 to the motor 234 until the supplied power falls below a predetermined threshold at which the AESS system takes over control of the engine 228 and determines when to turn the engine 228 completely off. Alternatively, the engines 228-232 of the remote powered units 104-110 may be individually turned on or off independent of an AESS system. For example, the engine 228-232 of a remote powered unit 110 may be turned on or off regardless of whether the engine 228-232 is susceptible to control by an AESS system.

The isolation control system 200 may remotely change the powered state of the engine(s) of one or more of the remote powered units 104-110 (shown in FIG. 1) in accordance with one or more of the embodiments described above. The isolation control system 200 includes a master isolation unit 202 and several slave controllers 204, 206, 208. In one embodiment, the master isolation unit 202 is disposed in the lead powered unit 102. Alternatively, only a part or subsection of the master isolation unit 202 is disposed in the lead powered unit 102. For example, a user interface 210 of the master isolation unit 202 may be located in the lead powered unit 102 while one or more other components of the master isolation unit 202 are disposed outside of the lead powered unit 102. The slave controllers 204-208 are disposed in one or more of the remote powered units 104-110. For example, the slave controller 204 may be located within the remote powered unit 104, the slave controller 206 may be disposed in the remote powered unit 106, and the slave controller 208 may be located at the remote powered unit 108. The number of slave controllers 204-208 in the isolation control system 200 may be different from the embodiment shown in FIG. 2. Similar to the master isolation unit 202, one or more components or parts of the slave controllers 204-208 may be disposed outside of the corresponding remote powered units 104-110. The master isolation unit 202 and/or slave controllers 204-208 may be embodied in one or more wired circuits with discrete logic components, microprocessor-based computing systems, and the like. As described below, the master isolation unit 202 and/or the slave controllers 204-208 may include microprocessors that enable the lead powered unit 102 (shown in FIG. 1) to remotely turn the remote powered units 104-110 on or off. For example, one or more microprocessors in the master isolation unit 202 and/or slave controllers 204-208 may generate and communicate signals between the master isolation unit and the slave controllers 204-208 that direct one or more of the corresponding engines 228-232 of the remote powered units 104-110 to change the powered state of the engines 228-232 from an "on" state to an "off" state, as described above.

The master isolation unit 202 includes the user interface 210 that accepts input from an operator of the master isolation unit 202. For example, the user interface 210 may accept commands or directions from an engineer or other operator of the lead powered unit 102 (shown in FIG. 1). By way of non-limiting example only, the user interface 210 may be any one or more of a rotary switch, a toggle switch, a touch sensitive display screen, a keyboard, a pushbutton, a software application or module running on a processor-based computing device, and the like. The operator inputs an isolation command 212 into the user interface 210. The isolation command 212 represents a request by the operator to turn one or more of the remote powered units 104-110 on and/or to turn one or more of the remote powered units 104-110 off. The user interface 210 communicates the operator's request to a master isolation module 214.

The master isolation module 214 receives the operator's request from the user interface 210 and determines which ones of the remote powered units 104-110 (shown in FIG. 1)

are to be turned on and/or which ones of the remote powered units 104-110 are to be turned off. For example, the isolation command 212 may request that a single remote powered unit 106 be turned off or on. Alternatively, the isolation command 212 may request that a group of the remote powered units 104-110 be turned on or off. For example, the isolation command 212 may select the remote powered units 104-110 in a selected consist group 116 and/or a distributed power group 118 (shown in FIG. 1) be turned off or on. By way of non-limiting example only, the master isolation module 214 may be embodied in any one or more of hardwired circuitry, rotary, or other types, of switches, a microprocessor based device, a software application or module running on a computing device, a discrete logic device, and the like. Based on the operator's request communicated via the isolation command 212, the master isolation module 214 conveys an isolation instruction 216 to a master input/output (I/O) device 218.

The master I/O device 218 is a device that communicates the isolation instruction 216 to the remote powered units 104-110 (shown in FIG. 1) selected by the master isolation module 214. For example, if the isolation command 212 from the operator requests that one or more individual remote powered units 104-110 be turned off or on, or that the remote powered units 104-110 in a selected consist or distributed power group 116, 118 be turned off or on, the master I/O device 218 communicates the isolation instruction 216 to at least those remote powered units 104-110 selected by the isolation command 212. By way of non-limiting example only, the master I/O device 218 may be embodied in one or more of a connector port that is electronically coupled with one or more wires joined with the remote powered units 104-110 (such as a trainline), an RF transmitter, a wireless transceiver, and the like. In one embodiment, the master I/O device 218 conveys the isolation instruction 216 to all of the remote powered units 104-110 in the rail vehicle system 100 (shown in FIG. 1). While the illustrated embodiment shows the isolation instruction 216 being communicated in parallel to the slave controllers 204-208, the isolation instruction 216 may be serially communicated among the slave controllers 204-208. For example, the master I/O device 218 may serially convey the isolation instruction 216 to the remote powered units 104-110 along a trainline. The remote powered units 104-110 that are to be turned on or off by the isolation instruction 216 receive the isolation instruction 216 and act on the isolation instruction 216. The remote powered units 104-110 that are not to be turned on or off by the isolation instruction 216 ignore the isolation instruction 216. For example, the remote powered units 104-110 may include discrete logic components that are coupled with a trainline and that receive the isolation instruction 216 when the isolation instruction 216 relates to the remote powered units 104-110 and ignores the isolation instruction 216 when the isolation instruction 216 does not relate to the remote powered units 104-110.

In another embodiment, the master I/O device 218 broadcasts the isolation instruction 216 to all of the remote powered units 104-110 (shown in FIG. 1) in the rail vehicle system 100 (shown in FIG. 1). For example, the master I/O device 218 may include a wireless transceiver that transmits data packets comprising the isolation instruction 216 to the remote powered units 104-110. Alternatively, the master I/O device 218 may be an RF transmitter that transits a radio frequency signal that includes the isolation instruction 216. The remote powered units 104-110 may be associated with unique identifiers, such as serial numbers, that distinguish the remote powered units 104-110 from one another. The isolation instruction 216 may include or be associated with one or more of the unique identifiers to determine which of the remote powered units 104-110 are to receive and act on the isolation instruction 216. For example, if the unique identifier of a remote powered unit 104-110 matches an identifier stored in a header of a data packet of the isolation instruction 216 or communicated in the RF signal, then the remote powered unit 104-110 having the mating unique identifier receives and acts on the isolation instruction 216.

A slave input/output (I/O) device 220 receives the isolation instruction 216 from the master I/O device 218. By way of non-limiting example only, the slave I/O devices 220 may be embodied in one or more of a connector port that is electronically coupled with one or more wires joined with the lead powered unit 102 (such as a trainline), an RF transmitter, a wireless transceiver, and the like. The slave I/O devices 220 convey the isolation instruction 216 to a slave isolation module 222.

The slave isolation module 222 receives the isolation instruction 216 from the slave I/O device 220 and determines if the corresponding remote powered unit 104-110 (shown in FIG. 1) is to be turned on or off in response to the isolation instruction 216. The slave isolation module 222 may include logic components to enable the slave isolation module 222 to determine whether the associated remote powered unit 104-110 (shown in FIG. 1) is to obey or ignore the isolation instruction 216. For example, the slave isolation modules 222 may include one or more of hardwired circuitry, relay switches, a microprocessor based device, a software application or module running on a computing device, and the like, to determine if the associated remote powered unit 104-110 is to act on the isolation instruction 216.

If the slave isolation module 222 determines that the corresponding remote powered unit 104-110 (shown in FIG. 1) is to be turned on or off in response to the isolation instruction 216, then the slave isolation module 222 communicates an appropriate command 224 to an engine interface device 226. The engine interface device 226 receives the command 224 from the slave isolation module 222 and, based on the command 224, directs the engine 228, 230, 232 of the corresponding remote powered unit 104-110 to turn on or off. For example, the engine interface device 226 associated with the remote powered unit 104 may communicate the command 224 to the engine 228 of the remote powered unit 104. By way of non-limiting example only, the engine interfaces 226 may be embodied in one or more of a connector port that is electronically coupled with the engines 228-232 via one or more wires. Upon receiving the command 224 from the engine interfaces 226, the engines 228-232 may change operational states from "on" to "off," or from "off" to "on." As described above, in one embodiment, the engines 228-232 may turn off and cease supplying electricity to a corresponding motor 234-238 in order to cause the motor 234-238 to supply or withhold application of tractive force. For example, if the engine 230 receives a command 224 directing the engine 230 to turn off and the engine 232 receives a command 224 directing the engine 232 to turn on, then the engine 230 shuts down and stops providing electricity to the motor 236, which in turn stops providing a tractive force to propel the rail vehicle system 100 (shown in FIG. 1), while the engine 232 turns on and begins supplying electricity to the motor 238 to cause the motor 238 to provide a tractive force to propel the rail vehicle system 100.

In one embodiment, the engine 228-232 turns on or off within a predetermined time period. For example, an engine 228 that is used to supply tractive effort may shut off within a predetermined time period after the slave isolation module 222 receives the isolation instruction 216. The predetermined time period may be established or set by an operator of the system 200. The turning on or off of the engine 228-232 within a predetermined time period after the slave isolation module 222 receives the isolation instruction 216 may permit an operator in the lead powered unit 102 (shown in FIG. 1) to send the isolation instruction 216 to the remote powered units 104-110 (shown in FIG. 1) to turn off the engines 228-232 immediately, or at least relatively soon after the isolation command 212 is input into the user interface 210. For example, the slave isolation modules 222 may turn off the engines 228-232 without waiting for the engines 228-232 to cool down to a threshold temperature.

The master isolation unit 202 may convey additional isolation instructions 216 to the slave controllers 204-208 during a trip. A trip includes a predetermined route between two or more waypoints or geographic locations over which the rail vehicle system 100 (shown in FIG. 1) moves. For example, an operator in the lead powered unit 102 (shown in FIG. 1) may periodically input isolation commands 212 into the master isolation unit 202 to vary the total amount of tractive force supplied by the powered units 102-110 (shown in FIG. 1). The operator may vary the number and/or type of powered units 102-110 being used to supply tractive force to propel the rail vehicle system 100 during the trip in order to account for various static or dynamically changing factors and parameters, such as, but not limited to, a speed limit of the rail vehicle system 100, a changing grade and/or curvature of the track 114 (shown in FIG. 1), the weight of the rail vehicle system 100, a distance of the trip, a distance of a segment or subset of the trip, a performance capability of one or more of the powered units 102-110, a predetermined speed of the rail vehicle system 100, and the like.

Figure 3:
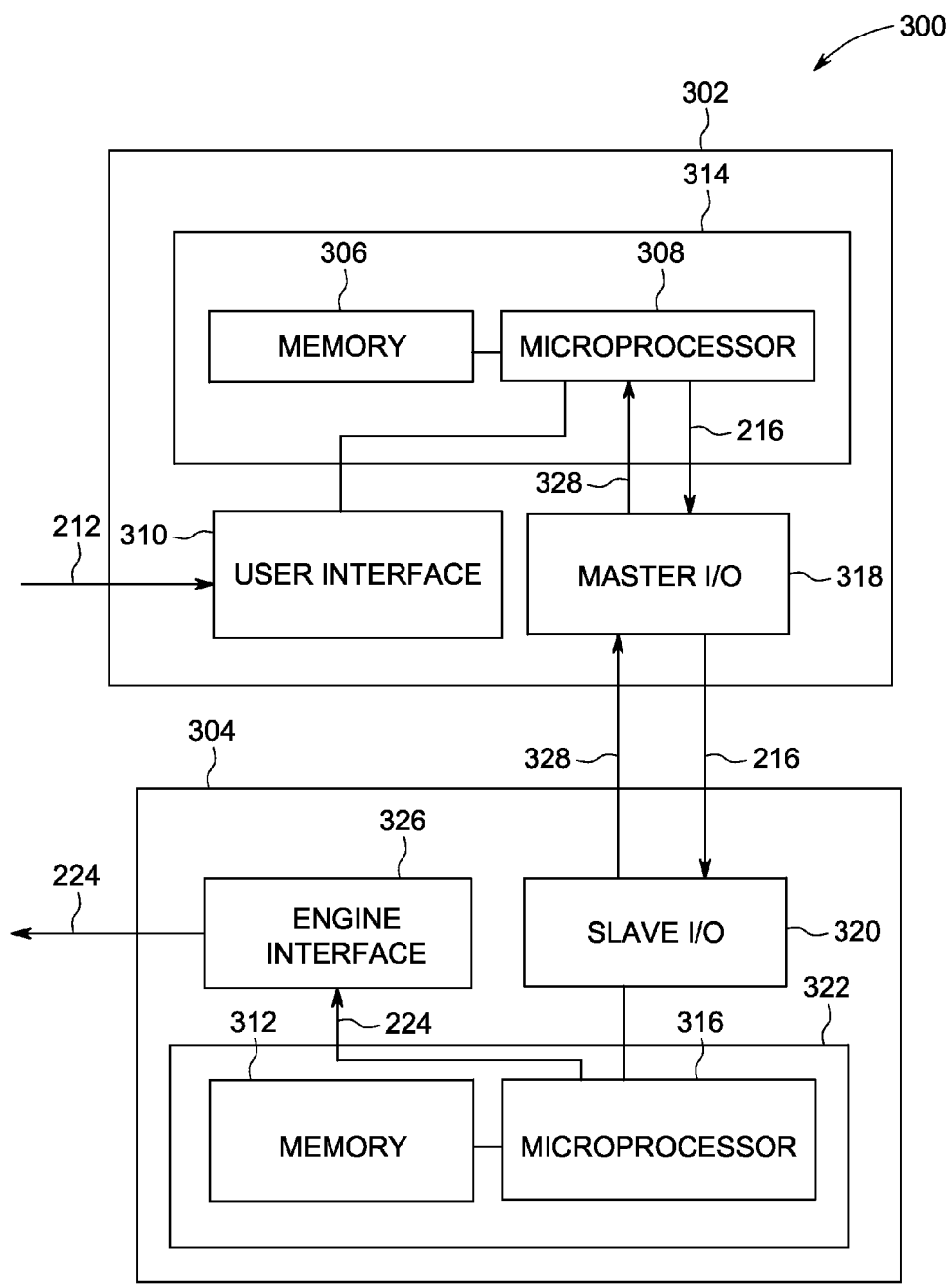
FIG. 3 is a schematic diagram of an isolation control system in accordance with another embodiment.

FIG. 3 is a schematic diagram of an isolation control system 300 in accordance with another embodiment. The control system 300 may be similar to the control system 200 (shown in FIG. 2). For example, the control system 300 may be used to remotely turn one or more remote powered units 104-110 (shown in FIG. 1) on or off from the lead powered unit 102 (shown in FIG. 1). The control system 300 is a microprocessor-based control system. For example, the control system 300 includes one or more microprocessors 308, 320 that permit an operator to manually turn one or more of the remote powered units 104-110 on or off. Additionally, the control system 300 may be utilized to automatically turn one or more of the remote powered units 104-110 on or off.

The control system 300 includes a master isolation unit 302 and a slave controller 304. The master isolation unit 302 may be similar to the master isolation unit 202 (shown in FIG. 2). For example, the master isolation unit 302 includes a master isolation module 314, a user interface 310, and a master I/O device 318. The user interface 310 may be the same as, or similar to, the user interface 210 (shown in FIG. 2) and the master I/O device 318 may be the same as, or similar to, the master I/O device 218 (shown in FIG. 2). The master isolation module 314 includes a memory 306 and a microprocessor 308. The memory 306 represents a computer readable storage device or medium. The memory 306 may include sets of instructions that are used by the microprocessor 308 to carry out one or more operations. By way of example only, the memory 306 may be embodied in one or more of an electrically erasable programmable read only memory (EEPROM), a read only memory (ROM), a programmable read only memory (PROM), an erasable programmable read only memory (EPROM), or FLASH memory. The microprocessor 308 represents a processor, microcontroller, computer, or other electronic computing or control device that is configured to execute executing instructions stored on the memory 306. (Thus, unless otherwise specified, the term "microprocessor" includes any of the aforementioned devices.)

The slave controller 304 may be similar to one or more of the slave controllers 204-208 (shown in FIG. 2). For example, the slave controller 304 includes a slave isolation module 322, an engine interface 326, and a slave I/O device 320. The engine interface 326 may be the same as, or similar to, the engine interface 226 (shown in FIG. 2) and the slave I/O device 320 may be the same as, or similar to, the slave I/O device 220 (shown in FIG. 2). The slave isolation module 322 may include a memory 312 and a microprocessor 316. Alternatively, one or more of the slave controllers 304 in the remote powered units 104-110 (shown in FIG. 1) does not include memories 312 and/or microprocessors 316. The memory 312 may be the same as, or similar to, the memory 306 in the master isolation module 314 and the microprocessor 316 may be the same as, or similar to, the microprocessor 308 in the master isolation module 314.

In operation, the master isolation unit 302 remotely turns the engines 228-232 (shown in FIG. 2) on or off in a manner similar to the master isolation unit 202 (shown in FIG. 2). The user interface 310 receives the isolation command 212 and communicates the isolation command 212 to the microprocessor 308 of the master isolation module 314. The master isolation module 314 receives the isolation command 212 and determines which remote powered units 104-110 (shown in FIG. 1) are to be turned on or off based on the isolation command 212. The master isolation module 314 may query the memory 306 to determine which remote powered units 104-110 to turn on or off. For example, if the isolation command 212 requests that the remote powered units 104-110 in a selected consist or distributed power group 116, 118 (shown in FIG. 1) be turned off, the microprocessor 308 may request a list of the remote powered units 104-110 that are in the selected consist or distributed power group 116, 118. The master isolation module 314 then sends the isolation instruction 216 to the master I/O device 318, which conveys the isolation instruction 216 to the selected remote powered units 104-110. For example, the microprocessor 308 may direct the master I/O device 318 to communicate the isolation instruction 216 only to the remote powered units 104-110 selected by the isolation command 212. In another example, the microprocessor 308 may embed identifying information in the isolation command 212. As described above, the identifying information may be compared to a unique identifier associated with each remote powered unit 104-110 to determine which of the remote powered units 104-110 are to act on the isolation instruction 216.

In one embodiment, the master isolation module 314 automatically generates the isolation instruction 216 and communicates the isolation instruction 216 to one or more of the remote powered units 104-110 (shown in FIG. 1). For example, the master isolation module 314 may determine a tractive effort needed or required to propel the rail vehicle system 100 (shown in FIG. 1) along a trip or a segment of the trip. The microprocessor 308 may calculate the required tractive effort from information and data stored in the memory 306. By way of example only, the microprocessor 308 may obtain and determine the required tractive effort based on the distance of the trip, the distance of one or more of the trip segments, the performance capabilities of one or more of the powered units 102-110 (shown in FIG. 1), the curvature and/or grade of the track 114 (shown in FIG. 1), transit times over the entire trip or a trip segment, speed limits, and the like.

As the rail vehicle system 100 (shown in FIG. 1) moves along the track 114 (shown in FIG. 1) during the trip, the microprocessor 308 of the master isolation module 314 may adaptively generate and communicate isolation instructions 216 to the slave controllers 304 of the remote powered units 104-110 (shown in FIG. 1) to vary which of the remote powered units 104-110 are turned on or off. During some segments of a trip, the required tractive effort may increase. For example, if the grade of the track 114 or the speed limit increases, the microprocessor 308 may determine that additional remote powered units 104-110 need to be turned on to increase the total tractive force provided by the powered units 102-110 (shown in FIG. 1). The microprocessor 308 may automatically generate an isolation instruction 216 that turns on one or more remote powered units 104-110 that previously were turned off. Alternatively, during other segments of a trip, the required tractive effort may decrease. For example, if the grade of the track 114 or the speed limit decreases, the microprocessor 308 may determine that fewer remote powered units 104-110 are needed to propel the rail vehicle system 100. The microprocessor 308 may automatically generate an isolation instruction 216 that turns off one or more remote powered units 104-110 that previously were turned on. The selection of which remote powered units 104-110 are turned on or off may be based on the performance capabilities of the remote powered units 104-110. The performance capabilities may include the tractive force provided by the various remote powered units 104-110, the rate at which the remote powered units 104-110 burn fuel, an exhaust emission of the remote powered units 104-110, an EPA Tier level of the remote powered units 104-110, the horsepower to weight ratio of the remote powered units 104-110, and the like.

The slave controllers 304 of one or more of the remote powered units 104-110 (shown in FIG. 1) receive the isolation instruction 216 and, based on the isolation instruction 216, turn the corresponding engines 228-232 (shown in FIG. 2) on or off, similar to as described above. In one embodiment, the microprocessors 316 in the slave controllers 304 receive the isolation instruction 216 and determine if the isolation instruction 216 applies to the corresponding remote powered unit 104-110. For example, the microprocessor 316 may compare identifying information in the isolation instruction 216 to a unique identifier stored in the memory 312 and associated with the corresponding remote powered unit 104-110. If the identifying information and the unique identifier match, the microprocessor 316 generates and communicates the command 224 to the engine interface 326. As described above, the engine interface 326 receives the command 224 and turns the associated engine 228-232 on or off based on the command 224.

In one embodiment, the slave controller 304 of one or more of the remote powered units 104-110 (shown in FIG. 1) provide feedback 328 to the master isolation unit 302. Based on the feedback 328, the master isolation unit 302 may automatically generate and communicate isolation instructions 216 to turn one or more of the remote powered units 104-110 on or off. Alternatively, the master isolation unit 302 may determine a recommended course of action based on the feedback 328 and report the recommended course of action to an operator. For example, the master isolation unit 302 may display several alternative courses of action on a display device that is included with or communicatively coupled with the user interface 310. An operator may then use the user interface 310 to select which of the courses of action to take. The master isolation module 314 then generates and communicates the corresponding isolation instruction 216 based on the selected course of action.

The feedback 328 may include different amounts of fuel that are consumed or burned by the remote powered units 104-110 (shown in FIG. 1). For example, the microprocessor 316 in at least one of the remote powered units 104-110 may calculate the various amounts of fuel that will be consumed by the powered units 102-110 (shown in FIG. 1) of the rail vehicle system 100 (shown in FIG. 1) over a time period with different combinations of the powered units 102-110 turned on or off. In one embodiment, a microprocessor 316 in each consist group 116 (shown in FIG. 1) and/or distributed power group 118 (shown in FIG. 1) calculates the amount of fuel that will be consumed by the rail vehicle system 100 with the remote powered units 104-110 in the corresponding consist or distributed power group 116, 118 turned on and the amount of fuel that will be consumed by the rail vehicle system 100 with the remote powered units 104-110 in the consist or distributed power group 116, 118 turned off. The calculated amounts of fuel are conveyed to the slave I/O device 320 and reported to the master isolation unit 302 as the feedback 328. Based on the feedback 328, the master isolation unit 302 determines whether to turn on or off one or more of the remote powered units 104-110. For example, each consist group 116 and/or distributed power group 118 may provide feedback 328 that notifies the master isolation unit 302 of the different amounts of fuel that will be consumed if the various groups 116, 118 are turned on or off. The microprocessor 308 in the master isolation unit 302 examines the feedback 328 and may generate automated isolation instructions 216 to turn one or more of the remote powered units 104-110 on or off based on the feedback 328.

As described above and as an alternative to microprocessor-based remote control of which remote powered units 104-110 (shown in FIG. 1) are turned on or off, the control system 200 (shown in FIG. 2) may use various circuits and switches to communicate the isolation instructions 216 (shown in FIG. 2) and to determine whether particular remote powered units 104-110 are to act on the isolation instructions 216. By way of example only, the powered units 102-110 (shown in FIG. 1) may include rotary switches that are joined with a trainline extending through the rail vehicle system 100. Based on the positions of the rotary switches, the remote powered units 104-110 may be remotely turned on or off from the lead powered unit 102. For example, if the rotary switches in each of the lead powered unit 102 and the remote powered units 104,106 are in a first position while the rotary switches in the remote powered units 108, 110 are in a second position, then the isolation instruction 216 is acted on by the remote powered units 104, 106 while the remote powered units 108, 110 ignore the isolation instruction 216.

Figure 4:
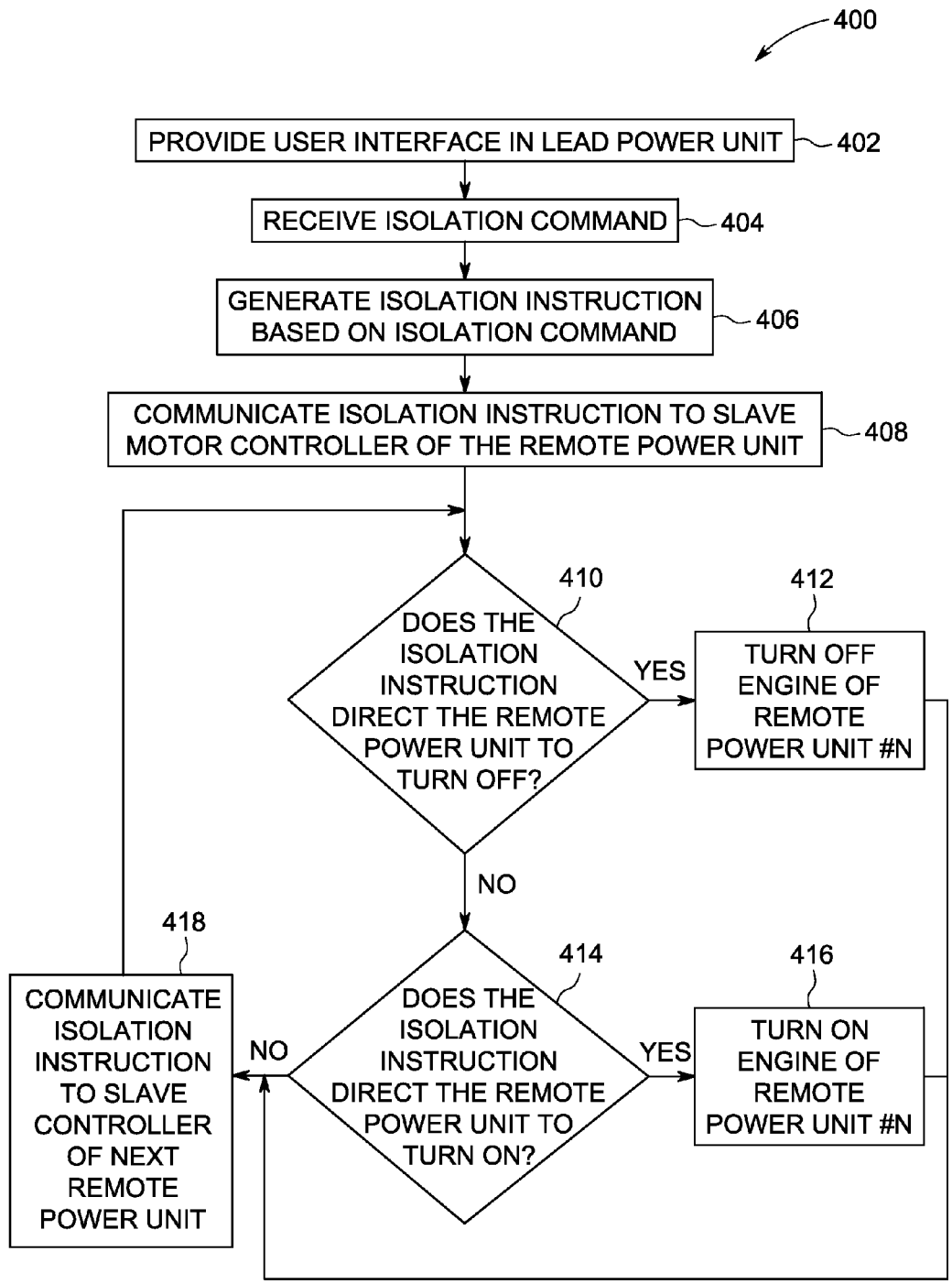
FIG. 4 is a flowchart for a method of controlling a rail vehicle system that includes a lead powered unit and a remote powered unit in accordance with one embodiment.

FIG. 4 is a flowchart for a method 400 of controlling a train that includes a lead powered unit and a remote powered unit in accordance with one embodiment. For example, the method 400 may be used to permit an operator in the lead powered unit 102 (shown in FIG. 1) to remotely turn one or more of the remote powered units 104-110 (shown in FIG. 1) on or off. At 402, a user interface is provided in the lead powered unit. For example, the user interface 210, 310 (shown in FIGS. 2 and 3) may be provided in the lead powered unit 102. The master isolation unit 202, 302 (shown in FIGS. 2 and 3) also may be provided in the lead powered unit 102. At 404, an isolation command is received by the user interface. For example, the isolation command 212 may be received by the user interface 210 or 310.

At 406, an isolation instruction is generated based on the isolation command. For example, the isolation instruction 216 (shown in FIG. 2) may be generated by the master isolation module 214, 314 (shown in FIGS. 2 and 3) based on the isolation command 212. At 408-418, the isolation instruction is communicated to the slave controllers of the remote powered units in a serial manner. For example, the isolation instruction 216 is serially communicated among the remote powered units 104-110 (shown in FIG. 1). Alternatively, the isolation instruction 216 is communicated to the slave controllers 204-208, 304 (shown in FIGS. 2 and 3) of the remote powered units 104-110 in parallel.

At 408, the isolation instruction is communicated to the slave controller of one of the remote powered units. For example, the isolation instruction 216 (shown in FIG. 2) may be communicated to the slave controller 204, 304 (shown in FIGS. 2 and 3) of the remote powered unit 104 (shown in FIG. 1). At 410, the isolation instruction is examined to determine if the isolation instruction directs the slave controller that received the isolation instruction to turn off the engine of the corresponding remote powered unit. If the isolation instruction does direct the slave controller to turn off the engine, flow of the method 400 continues to 412. At 412, the engine of the remote powered unit is turned off and flow of the method 400 continues to 418. On the other hand, if the isolation instruction does not direct the slave controller to turn the engine off, flow of the method 400 continues to 414. For example, the isolation instruction 216 may be examined by the slave isolation module 222, 322 (shown in FIGS. 2 and 3) of the remote powered unit 104 to determine if the isolation instruction 216 directs the remote powered unit 104 to turn off. If the isolation instruction 216 directs the remote powered unit 104 to turn off, the slave controller 204, 304 directs the engine 228 (shown in FIG. 2) of the remote powered unit 104 to turn off. Otherwise, the slave controller 204, 304 does not direct the engine 228 to turn off.

At 414, the isolation instruction is examined to determine if the isolation instruction directs the slave controller that received the isolation instruction to turn on the engine of the corresponding remote powered unit. If the isolation instruction does direct the slave controller to turn on the engine, flow of the method 400 continues to 416. At 416, the engine of the remote powered unit is turned on. For example, the isolation instruction 216 (shown in FIG. 2) may be examined by the slave isolation module 222, 322 (shown in FIGS. 2 and 3) of the remote powered unit 104 (shown in FIG. 1) to determine if the isolation instruction 216 directs the remote powered unit 104 to turn on. If the isolation instruction 216 directs the remote powered unit 104 to turn on, the slave controller 204, 304 directs the engine 228 (shown in FIG. 2) of the remote powered unit 104 to turn on. On the other hand, if the isolation instruction does not direct the slave controller to turn the engine on, flow of the method 400 continues to 418.

At 418, the isolation instruction is communicated to the slave controller of the next remote powered unit. For example, after being received and examined by the slave controller 204, 304 (shown in FIGS. 2 and 3) of the remote powered unit 104 (shown in FIG. 1), the isolation instruction 216 is conveyed to the slave controller 204, 304 of the remote powered unit 106 (shown in FIG. 1). Flow of the method 400 may then return to 410, where the isolation instruction is examined by the next remote powered unit in a manner similar to as described above. The method 400 may continue in a loop-wise manner through 410-418 until the remote powered units have examined and acted on, or ignored, the isolation instruction.

In another embodiment, the method 400 does not communicate and examine the isolation instructions in a serial manner through the remote powered units. Instead, the method 400 communicates the isolation instruction to the remote powered units in a parallel manner. For example, each of the remote powered units 104-110 (shown in FIG. 1) may receive the isolation instruction 216 (shown in FIG. 2) in parallel and act on, or ignore, the isolation instruction 216 in a manner described above in connection with 410-414.

Figure 5:
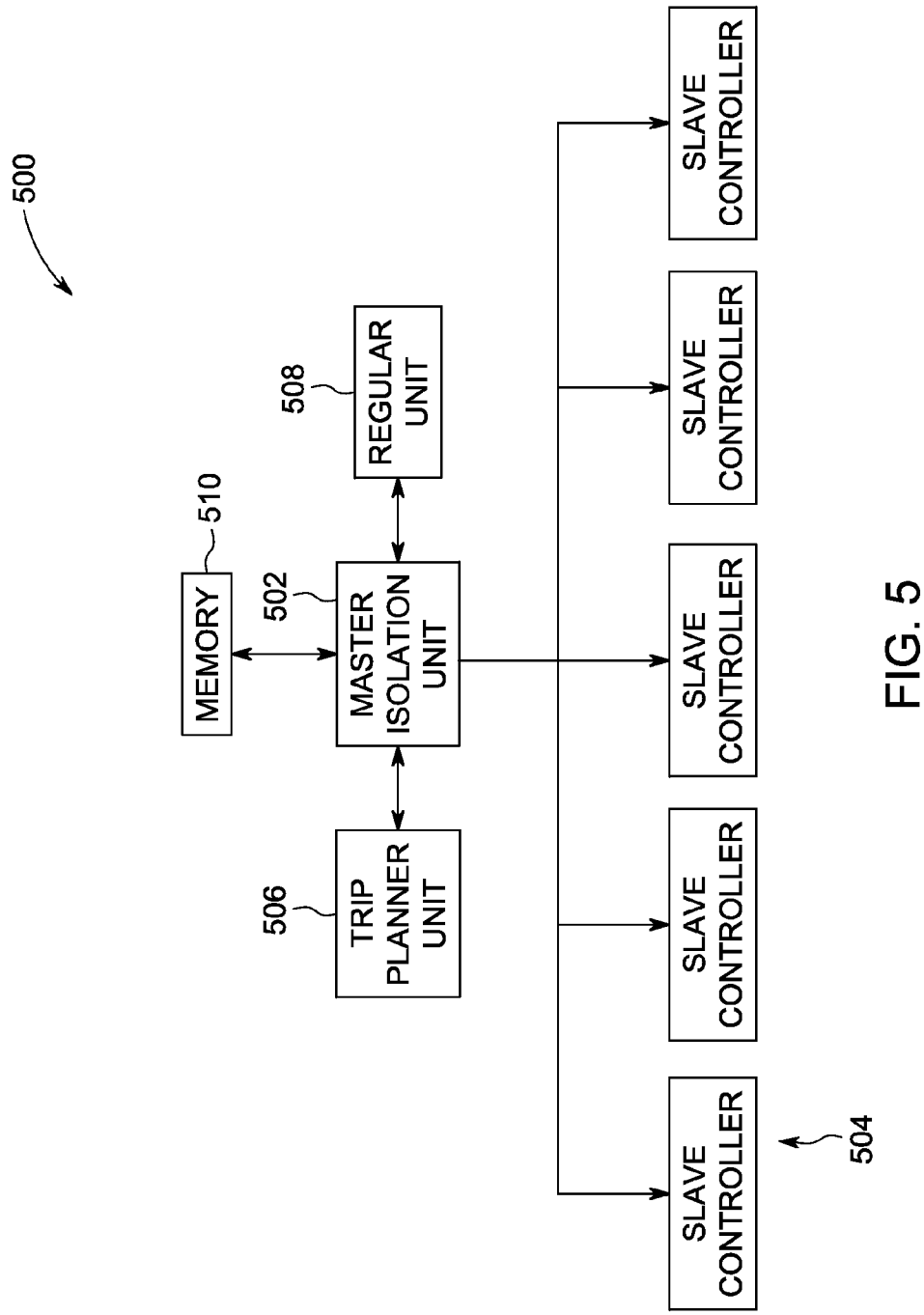
FIG. 5 is a schematic diagram of an isolation control system in accordance with an embodiment.

FIG. 5 is a schematic diagram of an isolation control system 500 in accordance with an embodiment. The control system 500 may be similar to the control system 200 (shown in FIG. 2) and/or the control system 300 (shown in FIG. 3). The control system 500 may be used to identify which propulsion-generating (e.g., powered) vehicles (e.g., units) in a vehicle system (such as the vehicle system 100) to turn off or to idle, when to turn the identified vehicles off or to idle, how long to keep the identified vehicles off or in idle (or when to turn one or more of the identified vehicles back on from being off or in idle), and/or to remotely turn the identified vehicles off or to idle (and/or to turn the identified vehicles back on from being off or in idle).

The control system 500 shown in FIG. 5 includes a master isolation unit 502 and one or more slave controllers 504. The master isolation unit 502 may be similar to or represent the master isolation unit 202 and/or 302 (shown in FIGS. 2 and 3) and the slave controllers 504 may be similar to or represent one or more of the slave controllers 204, 206, 208, 304 (shown in FIGS. 2 and 3). As described herein, the master isolation unit 502 may be disposed onboard one propulsion-generating vehicle in a vehicle system and the slave controllers 504 may be disposed onboard one or more other propulsion-generating vehicles in the same vehicle system. The master isolation unit 502 sends isolation instructions to the slave controllers 504 to selectively turn one or more of the propulsion-generating vehicles off or to idle, as described above.

The master isolation unit 502 receives an isolation command that instructs the master isolation unit 502 as to which propulsion-generating vehicles are to be turned off or to idle. Additionally or alternatively, the isolation command may instruct the master isolation unit 502 when to turn one or more of the propulsion-generating vehicles back on after being off or in idle. Such a command can be referred to as an activation command. As described above, the master isolation unit 502 communicates the instructions to the appropriate slave controllers 504 to turn the respective propulsion-generating vehicles off or to idle based on the isolation command.

The master isolation unit 502 may receive the isolation command from a trip planner unit 506 and/or a regulator unit 508. One or both of the units 506, 508 may be disposed onboard the same vehicle as the master isolation unit 502, may be off-board the vehicle system 100, or may be disposed onboard another vehicle in the vehicle system 100. The units 506, 508 represent one or more controllers, such as one or more processors, microcontrollers, or the like, that operate based on one or more sets of instructions (e.g., software and/or hard-wired logic) stored on a tangible and non-transitory computer readable medium (or media). The units 506, 508 determine which propulsion-generating vehicles in a vehicle system to turn to idle or off, and when to turn the selected propulsion-generating vehicles off or to idle. Additionally or alternatively, the units 506, 508 may determine which propulsion-generating vehicles in the vehicle system to turn back on, and when to turn the selected propulsion-generating vehicles on. Based on these decisions, the units 506, 508 can generate and communicate isolation commands to the master isolation unit 502 for turning the selected propulsion-generating vehicles off or to idle. The units 506, 508 have access to one or more memories 510 that may be similar to or represent the memory 306 (shown in FIG. 3). Data stored in the memory 510 may be used by the units 506, 508 for selecting which vehicles to turn off or to idle, determining when to turn these vehicles off or to idle, selecting which vehicles to turn on, and/or when to turn these vehicles during travel of the vehicle system along a route, such as a track.

The trip planner unit 506 obtains, creates, and/or modifies a trip plan for travel of the vehicle system 100 during a trip. The trip plan may include an operational trajectory of the vehicle system 100 over the course of the trip. Such a trajectory may dictate operational settings of the vehicle system 100 as a function of time elapsed during the trip and/or distance traveled in the trip. The operational settings that are designated by the trip plan may include motive outputs (e.g., tractive forces, horsepower, or other power outputs) of the vehicle system 100, velocities of the vehicle system 100, accelerations and/or decelerations of the vehicle system 100, throttle settings of the propulsion-generating vehicles in the vehicle system 100, brake settings of the propulsion- and/or non-propulsion-generating vehicles in the vehicle system 100, and the like. For example, a trip plan may direct the vehicle system 100 to produce 3400 hp over a first distance or time period, 3600 hp over a second distance or time period, 3200 hp over a third distance or time period, 5800 hp over a fourth distance or time period, and so on. The designated operational settings of the trip plan may be created by the trip planner unit 506 in order to achieve one or more objective goals of the trip. An objective goal may include reaching one or more designated locations within designated time periods, while abiding by restrictions such as speed limits and capabilities of the vehicle system 100. An additional or alternative objective goal may be to travel along the trip while reducing the amount of fuel consumed and/or emissions generated by the vehicle system relative to the same vehicle system traveling over the same trip using one or more different operational settings than the operational settings designated by the trip plan.

The trip planner unit 506 may generate the trip plan based on the terrain over which the vehicle system 100 will travel (e.g., grade and/or curvature of the route to be traveled upon), the size of the vehicle system 100 (e.g., mass and/or length), speed restrictions along the route of the trip, emissions restrictions along the route of the trip, and the like. For example, the trip planner unit 506 may create a trip plan that directs the propulsion-generating vehicles in the vehicle system 100 to produce more horsepower during uphill grades and less horsepower during downhill grades, in locations with speed restrictions, and the like.

Figure 6:
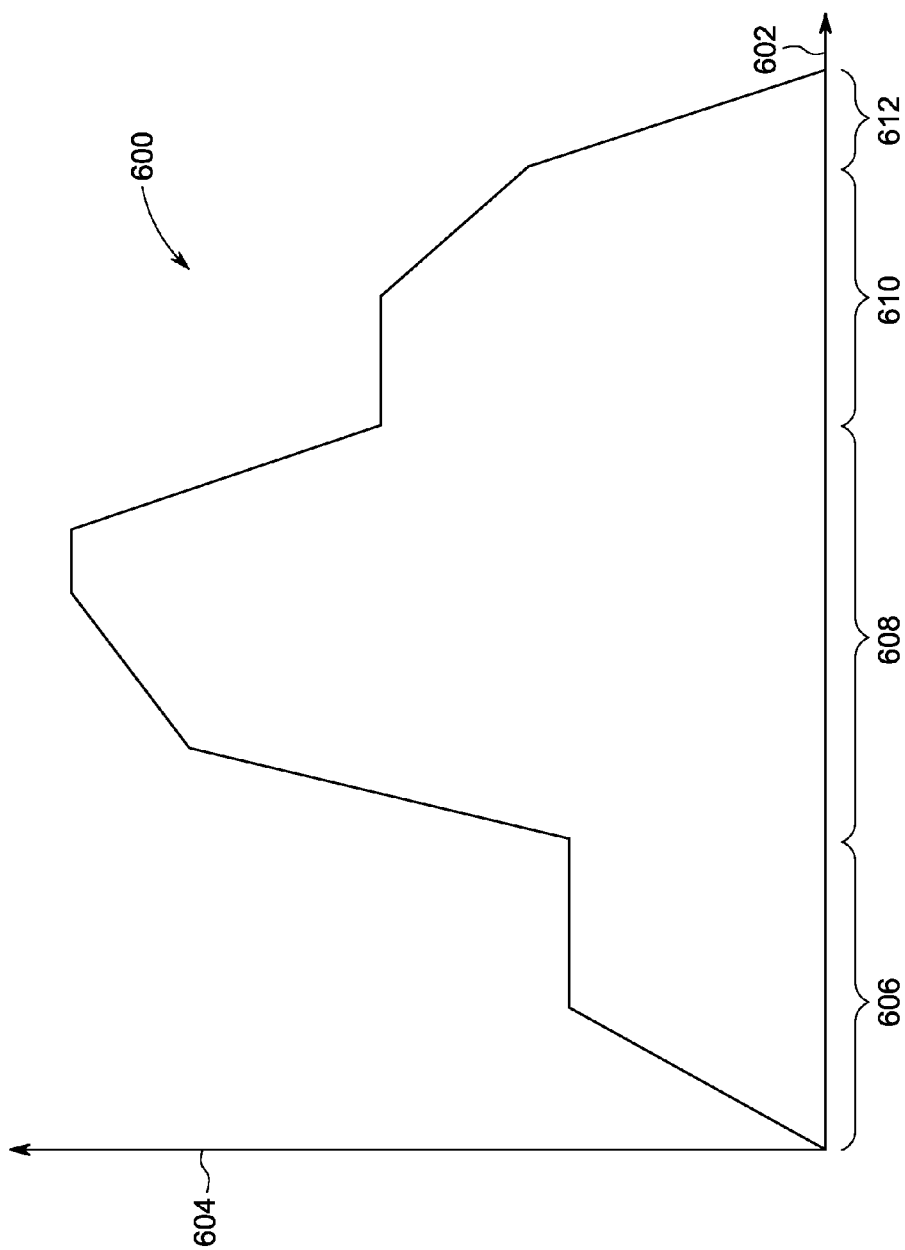
FIG. 6 is an example of a trip plan for a vehicle system.

FIG. 6 is an example of a trip plan 600. The trip plan 600 represents operational settings of the vehicle system 100, such as a total amount of motive output that is to be provided by the vehicle system 100. The trip plan 600 is shown alongside a horizontal axis 602 representative of distance along the trip and/or time elapsed during the trip and a vertical axis 604 representative of the magnitude of the operational settings designated by the trip plan 600. As shown in FIG. 6, different amounts of total motive output (e.g., horsepower) are designated by the trip plan 600 at different time periods and/or distances along the trip. These different amounts of total power may be referred to as required motive outputs of the trip plan 600. Alternatively, the trip plan 600 may designate or require different speeds of the vehicle system 100 at different locations and/or times.

The trip plan 600 may be referred to as representing demanded motive output from the vehicle system 100 at different locations and/or times along the trip. For example, the trip plan 600 can represent the total tractive power output that is demanded from the vehicle system 100 at the different locations and/or times along the trip. Additionally or alternatively, the trip plan 600 may designate throttle settings of the propulsion-generating vehicles in the vehicle system 100, which may correspond to motive outputs of these propulsion-generating vehicles. The trip planner unit 506 may use the designated throttle settings to determine the total motive outputs of the vehicle system 100 that are demanded or designated by the trip plan 600.

In an embodiment, the trip planner unit 506 examines a capability of the vehicle system 100 to provide the demanded motive output of the trip plan 600 and determines if a total capability of the vehicle system 100 exceeds the demanded motive output of the trip plan 600. For example, if the trip plan 600 represents the motive output demanded by the vehicle system 100, then the trip planner unit 506 may examine the total motive output (e.g., horsepower) that the propulsion-generating vehicles in the vehicle system 100 can provide. If the total motive output capability of the propulsion-generating vehicles is greater than the demanded motive output of the trip plan (or is greater than the demanded motive output by at least a designated, non-zero threshold), then the total capability of the vehicle system 100 exceeds the demanded motive output of the trip plan 600.

The vehicle system 100 shown in FIG. 1 includes five propulsion-generating vehicles 102, 104, 106, 108, 110. The vehicles 102, 106, 108 may each be able to provide up to 4400 hp of tractive power output, while the vehicle 104 may be able to provide only up to 3600 hp and the vehicle 110 is only able to provide up to 4000 hp. The propulsion-generating vehicles 102, 104, 106, 108, 110 may be able to provide different amounts of horsepower due to the vehicles being different types of propulsion-generating vehicles, different ages of the vehicles, the vehicles being in different states of health or repair, or the like.

The trip planner unit 506 may compare the total capability of the vehicle system 100 to the demanded output of the trip plan 600 to identify any excess capability of the vehicle system 100. An excess capability may be identified where the sum total of the motive outputs of the propulsion-generating vehicles 102, 104, 106, 108, 110 in the vehicle system 100 is greater than the demanded output of the trip plan 600. In continuing with the above example, the total motive output capability of the vehicle system 100 may be 20,800 hp. But, one or more sections of the trip plan 600 may require less than 20,800 hp. For example, a first segment 606 of the trip plan 600 may direct the vehicle system 100 to provide up to, but no more than, 5,000 hp, a second segment 608 may require up to 20,000 hp, a third segment 610 may require up to 10,000 hp, and a fourth segment 612 may require no more than 8,000 hp. The trip planner unit 506 may therefore calculate an excess capability of more than 15,000 hp in the first segment 606 of the trip plan 600, an excess capability of less than 1,000 hp in the second segment 608, an excess capability of more than 10,000 hp in the third segment 610, and an excess capability of more than 12,000 hp in the fourth segment 612.

The trip planner unit 506 may then examine the relative contributions of the propulsion-generating vehicles 102, 104, 106, 108, 110 to the total capability of the vehicle system 100 to select one or more of the vehicles 102, 104, 106, 108, 110 to turn off or to idle when the vehicle system 100 is traveling in one or more of the segments 606, 608, 610, 612 of the trip plan 600. The trip planner unit 506 may refer to a table, list, database, or other memory structure stored internally in the trip planner unit 506, in the memory 510, and/or in another location that is accessible by the trip planner unit 506. This table, list, database, or other memory structure may include information on how much motive output each of the propulsion-generating vehicles 102, 104, 106, 108, 110 provides. The trip planner unit 506 can determine if one or more of the propulsion-generating vehicles 102, 104, 106, 108, 110 can be turned off or to idle (or otherwise modified so that the propulsion-generating vehicle does not act to propel the vehicle system 100 or otherwise contribute to the total horsepower provided by the vehicle system 100).

In the first segment 606 of the trip plan 600, the trip planner unit 506 may determine that several propulsion-generating vehicles 102, 104, 106, 108, 110 can be turned off or to idle while the vehicle system 100 still has sufficient horsepower capability to propel the vehicle system 100 through the first segment 606 according to the trip plan. For example, the trip planner unit 506 may select the vehicles 102, 106, 108 for being turned off or to idle while the vehicle system 100 travels through the first segment 606 of the trip plan 600. Turning these selected vehicles off or to idle will reduce the motive output capability of the vehicle system 100 to 7,600 hp, which is more than the 5,000 hp required by the trip plan 600 in the first segment 606. Alternatively, the trip planner unit 506 may select another combination of vehicles 102, 104, 106, 108, 110 for being turned off or to idle in the first segment 606 of the trip plan 600.

Additionally or alternatively, the trip planner unit 506 may change the designated operational settings of one or more of the propulsion-generating vehicles 102, 104, 106, 108, 110 during travel in the first segment 606 of the trip plan 600. For example, even with turning the propulsion-generating vehicles 102, 106, 108 off or to idle for travel in the first segment 606, the remaining propulsion-generating vehicles 104, 110 may still have a total motive output capability that exceeds the 5,000 hp required by the trip plan 600 in the first segment 606. The trip planner unit 506 may then change the designated throttle settings of the trip plan 600 so that the total motive output of the remaining propulsion-generating vehicles that are not turned off or to idle is reduced, but is closer to the motive output required or designated by the trip plan 600 than if the throttle settings of remaining propulsion-generating vehicles were not reduced. For example, instead of the propulsion-generating vehicles 104, 110 operating at throttle settings of eight (out of eight throttle settings) when the vehicle system 100 is traveling in the first segment 606 of the trip plan 600, the vehicles 104, 110 may operate at throttle settings of five and seven, respectively. As a result, the total actual motive output of the vehicle system 100 may be reduced to 5,500 hp (or another power output), which is closer to the 5,000 hp designated by the trip plan 600 in the first segment 606 than the 7,600 hp that otherwise would have been provided by the propulsion-generating vehicles 104, 110 is the designated throttle settings of these vehicles were not reduced.

In the second segment 608 of the trip plan 600, the trip planner unit 506 may determine that the excess capability of the vehicle system 100 in the first section 606 has been reduced such that the propulsion-generating vehicles 102, 106, 108 that were turned off or to idle in the first segment 606 need to be turned back on. For example, the motive outputs designated by the trip plan 600 in the second segment 608 may be as large as 20,000 hp. Because the total capability of the vehicle system 100 may be 20,800 hp, all of the propulsion-generating vehicles in the vehicle system 100 may need to be turned on to generate sufficient motive output to meet the designated motive output of the trip plan 600 in the second segment 608. Additionally or alternatively, the trip planner unit 506 may change the designated operational settings of one or more of the propulsion-generating vehicles 102, 104, 106, 108, 110 during travel in the second segment 608. For example, the propulsion-generating vehicles 102, 104, 106, 108, 110 may have a total motive output capability that exceeds the 20,000 hp designated by the trip plan 600 in the second segment 608.

The trip planner unit 506 may change the designated throttle settings of the trip plan 600 so that the total motive output of the propulsion-generating vehicles is reduced, but is no smaller than the designated motive output of the trip plan 600 and is closer to the motive output required or designated by the trip plan 600 than if the throttle settings of propulsion-generating vehicles were not reduced. For example, instead of the propulsion-generating vehicles 102, 104, 106, 108, 110 operating at throttle settings of eight when the vehicle system 100 is traveling in the second segment 608 of the trip plan 600, the vehicles 102, 106 may operate at throttle settings of seven, while the remaining vehicles 104, 108, 110 operate at throttle settings of eight. As a result, the total actual motive output of the vehicle system 100 may be reduced to an amount that is closer to, but no less than, the 20,000 hp designated by the trip plan 600 in the second segment 608.

In the third and fourth segments 610, 612 of the trip plan 600, the trip planner unit 506 may determine that several propulsion-generating vehicles 102, 104, 106, 108, 110 can be turned off or to idle while the vehicle system 100 still has sufficient horsepower capability to propel the vehicle system 100 through the segments 610, 612 according to the trip plan. For example, the trip planner unit 506 may select the vehicles 104, 110 and at least one of the vehicles 102, 108, 110 for being turned off or to idle while the vehicle system 100 travels through the third and fourth segments 610, 612 of the trip plan 600. Turning these selected vehicles off or to idle will reduce the motive output capability of the vehicle system 100 while the vehicle system 100 still provides at least the designated motive output designated by the trip plan 600. The throttle settings of one or more of the propulsion-generating vehicles that remain on in the segments 610, 612 may be reduced as well, as described above.

The trip planner unit 506 also can base the selection of which propulsion-generating vehicles are turned off or to idle (and/or the changing of the throttle settings of the propulsion-generating vehicles) on the locations of the propulsion-generating vehicles within the vehicle system 100 and the terrain of the route over which the trip plan 600 extends. For example, when the trip plan 600 involves the vehicle system 100 traversing a peak, the trip planner unit 506 may choose which of the propulsion-generating vehicles 102 or 110 to turn off or to idle based on where these vehicles 102, 110 are located. During the portion of the trip plan 600 where the vehicle 102 has partially traversed the peak such that the vehicle 102 has passed over the peak and is on a downward grade, but the vehicle 110 is still traveling uphill toward the peak, the trip planner unit 506 may modify or create the trip plan 600 accordingly. The trip planner unit 506 may modify or create the trip plan 600 to direct the leading propulsion-generating vehicle 102 to turn off or to idle while directing the trailing propulsion-generating vehicle 110 to increase motive output or throttle setting so that the vehicle system 100 has sufficient motive output to traverse the peak.

In another example, when the trip plan 600 involves the vehicle system 100 traversing a valley, the trip planner unit 506 may choose which of the propulsion-generating vehicles 102 or 110 to turn off or to idle based on where these vehicles 102, 110 are located. During the portion of the trip plan 600 where the vehicle 102 has partially traversed the valley such that the vehicle 102 has passed over the valley and is on an upward grade, but the vehicle 110 is still traveling downhill toward the valley, the trip planner unit 506 may modify or create the trip plan 600 to direct the trailing propulsion-generating vehicle 110 to turn off or to idle while the leading propulsion-generating vehicle 102 is directed to increase motive output or throttle setting so that the vehicle system 100 has sufficient motive output to traverse the valley.

The trip planner unit 506 may create a trip plan in this manner by comparing the total capability of the vehicle system 100 with the demanded output at different locations and/or times in a trip, identifying excesses in the total capability above the demanded output, and selecting one or more propulsion-generating vehicles to be turned off or to idle within the segments of the trip where the excesses are identified. The selected propulsion-generating vehicles may be directed by the trip plan to be turned off or to idle in these segments of the trip so that the amount of excess is reduced but the vehicle system 100 still has sufficient capability to travel according to the trip plan.

Figure 7:
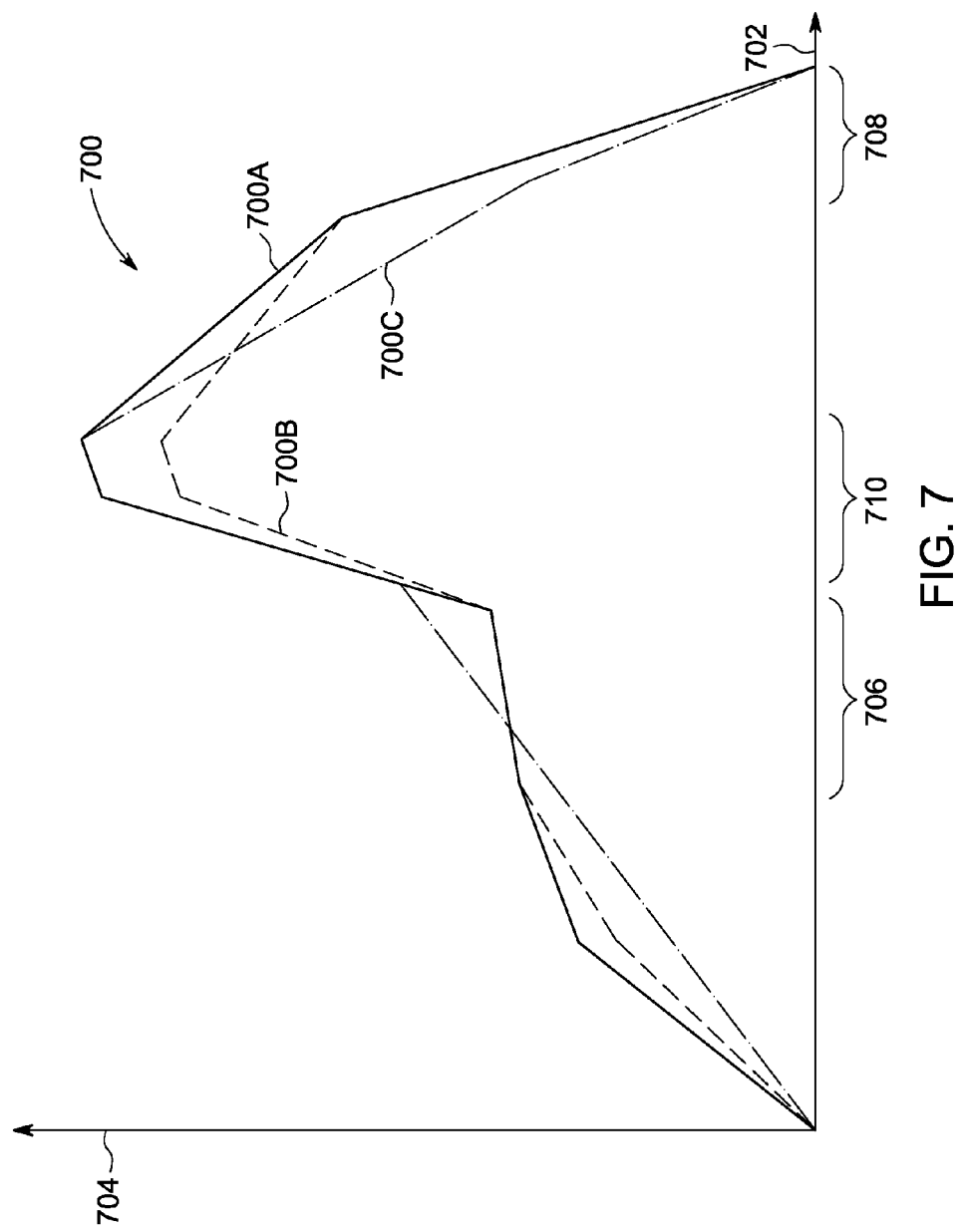
FIG. 7 is another example of several potential trip plans for the vehicle system.

FIG. 7 is another example of several potential trip plans 700 (e.g., trip plans 700A-C) for the vehicle system 100. The potential trip plans 700 may be created for the same vehicle system 100 to travel over the same route in the same trip, but with different propulsion-generating vehicles 102, 104, 106, 108, 110 being turned off or to idle. The trip plans 700 shown in FIG. 7 may represent speed trajectories of the vehicle system 100. For example, a horizontal axis 702 can represent time elapsed during a trip or distance along a route for the trip while the vertical axis 704 can represent designated speeds at which the vehicle system 100 is to travel at the corresponding times and/or distances of the horizontal axis 702. Alternatively, the trip plans 700 may represent other trajectories or designate other operational settings, such as motive outputs, accelerations, decelerations, throttle settings, brake settings, or the like.

The trip planner unit 506 may create a first potential trip plan 700A that represents the designated operations of the vehicle system 100 (e.g., designated velocities) with all of the propulsion-generating vehicles 102, 104, 106, 108, 110 being on and generating propulsive force to propel the vehicle system 100. A different, second potential trip plan 700B may represent the designated operations of the vehicle system 100 (e.g., designated velocities) with a first subset of the propulsion-generating vehicles 102, 104, 106, 108, 110 being turned off or to idle and not generating propulsive force to propel the vehicle system 100. For example, the trip plan 700B may be associated with the propulsion-generating vehicle 104 being off or in idle. A different, third potential trip plan 700C may represent the designated operations of the vehicle system 100 (e.g., designated velocities) with a different, second subset of the propulsion-generating vehicles 102, 104, 106, 108, 110 being turned off or to idle and not generating propulsive force to propel the vehicle system 100. For example, the trip plan 700C may be associated with the propulsion-generating vehicles 104, 108 being off or in idle. Additional potential trip plans 700 may be generated by the trip planner unit 506 with different subsets or combinations of the propulsion-generating vehicles 102, 104, 106, 108, 110 being off or in idle.

The trip planner unit 506 may create a set of all potential trip plans 700 that are created with different combinations of the propulsion-generating vehicles 102, 104, 106, 108, 110 being off or in idle. The trip planner unit 506 may filter this set to remove one or more trip plans 700, such as those trip plans 700 that are likely to result in the vehicle system 100 not reaching a destination location within a designated time period, the vehicle system 100 generating emissions above a designated threshold, the vehicle system 100 consuming more fuel than a threshold, or the like, based on simulations of travel, models of travel, or previous travel of the vehicle system 100 according to the different trip plans 700.

The trip planner unit 506 can compare the potential trip plans 700 to determine if overlap or commonality exists between the trip plans 700. For example, as shown in FIG. 7, the first potential trip plan 700A and the second potential trip plan 700B overlap or otherwise designate the same or similar operational settings for the vehicle system 100 over a first trip segment 706 and a subsequent, second trip segment 708. These trip segments 706, 708 may be identified as portions of the trip where the designated operational settings (e.g., velocities) of the vehicle system 100 are the same or similar (e.g., within a relatively small designated threshold). For example, if the trip plans 700A, 700B designate velocities of the vehicle system 100, then the vehicle system 100 having all propulsion-generating vehicles 102, 104, 106, 108, 110 activated and producing propulsive power and the vehicle system 100 having the propulsion-generating vehicle 104 off or in idle are planned to travel at the same speeds in the trip segments 706, 708.

The first potential trip plan 700A and the third potential trip plan 700C overlap or otherwise designate the same or similar operational settings for the vehicle system 100 only over a third trip segment 710 in the example shown in FIG. 7. This trip segment may be identified as a portion of the trip where the designated operational settings of the vehicle system 100 are the same or similar. For example, if the trip plans 700A, 700C designate velocities of the vehicle system 100, then the vehicle system 100 having all propulsion-generating vehicles 102, 104, 106, 108, 110 activated and producing propulsive power and the vehicle system 100 having the propulsion-generating vehicles 104, 108 off or in idle are planned to travel at the same speeds in the trip segment 710.

The trip planner unit 506 may determine and compare the potential trip plans 700 having different combinations of the propulsion-generating vehicles in the vehicle system 100 off or in idle (and/or with all propulsion-generating vehicles being on) prior to the vehicle system 100 embarking on the trip. The trip planner unit 506 may then use the comparisons of the trip plans 700 to identify the trip segments where the designated operational settings are the same or similar in order to create a hybrid trip plan. The hybrid trip plan can be a combination of trip segments that are common or overlap between two or more of the potential trip plans. For example, a hybrid trip plan may include the designated operational settings (e.g., velocities) of the vehicle system 100 in the first, second, and third trip segments 706, 708, 710. For other segments of the hybrid trip plan, the trip planner unit 506 may designate the same operational settings as one or more of the potential trip plans, such as the first potential trip plan 700.

In creating the hybrid trip plan, the trip planner unit 506 may direct the same propulsion-generating vehicles that are directed to be off or in idle in the common trip segments 706, 708, 710 also to be off or in idle in the hybrid trip plan. For example, the trip planner unit 506 can create the hybrid trip plan such that the propulsion-generating vehicles 102, 104, 106, 108, 110 are all on and generating propulsive forces from the start of the trip until the start of the first trip segment 706. The hybrid trip plan may then direct the propulsion-generating vehicle 104 to turn off or to idle as the vehicle system 100 travels through the first trip segment 706. The hybrid trip plan can direct the propulsion-generating vehicle 104 to turn back on upon the vehicle system 100 exiting the first trip segment 706. The propulsion-generating vehicles 104, 108 may then be directed by the hybrid trip plan to turn off or to idle when the vehicle system 100 enters the third trip segment 710. If the time period and/or distance between the first and third trip segments 706, 710 is relatively small (e.g., shorter or smaller than a designated threshold), then the hybrid trip plan may direct the propulsion-generating vehicle 104 to remain off or in idle from entrance of the vehicle system 100 into the first trip segment 706 to exit of the vehicle system 100 from the third trip segment 710. The hybrid trip plan can direct the propulsion-generating vehicles 104, 108 to turn back on when the vehicle system 100 exits the third trip segment 710, and then direct the propulsion-generating vehicle 104 to turn back off or to idle when the vehicle system 100 reaches the second trip segment 708. The preceding description presents one example of a hybrid trip plan. Other such plans may be created with different propulsion-generating units turning off, on, or to idle over different segments of the trip.

Returning to the discussion of the control system 500 shown in FIG. 5, the trip planner unit 506 may create trip plan with different combinations of propulsion-generating vehicles being off or in idle at different times along a trip prior to the vehicle system 100 embarking on the trip. As described above, the trip plan may be created by identifying excess capabilities of the vehicle system 100 in segments of the trip and/or by comparing different potential trip plans associated with different combinations of the propulsion-generating vehicles being turned off or to idle. During actual travel of the vehicle system 100, the trip planner unit 506 may be directed by the regulator unit 508 (shown in FIG. 5) to revise the trip plan or create another, different trip plan if the actual operations of the vehicle system 100 deviate from the designated operational settings of the trip plan or hybrid trip plan by more than a designated amount. For example, the regulator unit 508 may be communicatively coupled with one or more sensors (e.g., tachometers, torque or force sensors, input devices that monitor throttle positions, brake pressure sensors, and the like; not shown in FIG. 5) that the regulator unit 508 uses to monitor the actual operational settings of the vehicle system 100. If the actual operational settings deviate from the operational settings designated by the trip plan, the regulator unit 508 may direct the trip planner unit 506 to modify the trip plan so that the vehicle system 100 can return to actually traveling according to the designated operational settings of the trip plan.

The designations in the trip plan of which propulsion-generating vehicles 102, 104, 106, 108, 110 are turned off or to idle may be communicated to the master isolation unit 502. These designations may be communicated to the master isolation unit 502 and used by the master isolation unit 502 in a manner similar to the isolation commands described above. For example, the trip planner unit 506 may communicate isolation commands to the master isolation unit 502 that identify which propulsion-generating vehicles in the vehicle system 100 are to be turned off or to idle, and when these propulsion-generating vehicles are to be turned off or to idle. The trip planner unit 506 may communicate isolation commands to the master isolation unit 502 that identify which propulsion-generating vehicles in the vehicle system 100 are to be turned back on from being off or in idle, and when these propulsion-generating vehicles are to be turned on. These types of isolation commands also may be referred to as activation commands.

In an embodiment, the regulator unit 508 may determine which propulsion-generating vehicles in the vehicle system 100 may be turned off or to idle as the vehicle system 100 is traveling along the route for the trip. As described above, the trip planner unit 506 may make this determination for the entire trip of the vehicle system 100 or for a significant portion (e.g., more than half) of the trip, and may make this determination prior to the vehicle system 100 embarking or starting the trip. The regulator unit 508 can make this determination as the vehicle system 100 travels along the route during the trip.

For example, the regulator unit 508 can identify one or more propulsion-generating vehicles to be turned off or to idle on-the-fly, in real time, or otherwise as the vehicle system 100 actually travels along the route for a trip. This determination may be made by comparing the capabilities of the propulsion-generating vehicles with the output demanded by the trip plan in order to identify excess capabilities of the vehicle system 100, similar to as described above. The regulator unit 508 may determine the outputs of the propulsion-generating vehicles as the vehicle system 100 travels along the route during the trip, such as by receiving data from one or more speed sensors, motive output (e.g., torque) sensors, throttle devices, brake control devices, brake pressure sensors, or the like. The regulator unit 508 can monitor changes in the outputs of the propulsion-generating vehicles in order to determine changes in the total capability of the vehicle system 100 to move along the route.

The regulator unit 508 may receive the trip plan from the trip planner unit 506 and/or from a memory (e.g., the memory 510 or another memory that is accessible to the regulator unit 508). The regulator unit 508 can determine the output demanded by the trip plan, such as the total motive output demanded of the vehicle system 100 in order to travel according to the trip plan, using the received trip plan. Similar to as described above, the regulator unit 508 can compare the demanded output with the monitored capabilities of the propulsion-generating vehicles to determine whether an excess capability exists in one or more upcoming sections of the route during the trip. If such an excess is identified, the regulator unit 508 can select one or more of the propulsion-generating vehicles to turn off or to idle to reduce this excess capability while maintaining the total capability of the vehicle system 100 above the demanded output of the trip plan. The regulator unit 508 can refer to a table, list, database, or other memory structure in a memory (e.g., the memory 510 or another memory that is accessible to the regulator unit 508) that provides the different capabilities of the propulsion-generating vehicles. Additionally or alternatively, the regulator unit 508 can monitor the outputs from the propulsion-generating vehicles in order to determine the respective capabilities of the propulsion-generating vehicles. The regulator unit 508 may then select one or more propulsion-generating vehicles for turning off or to idle based on the different capabilities of the vehicles to reduce the excess capability of the vehicle system, similar to as described above in connection with the trip planner unit 506 and FIG. 6.

Figure 8:
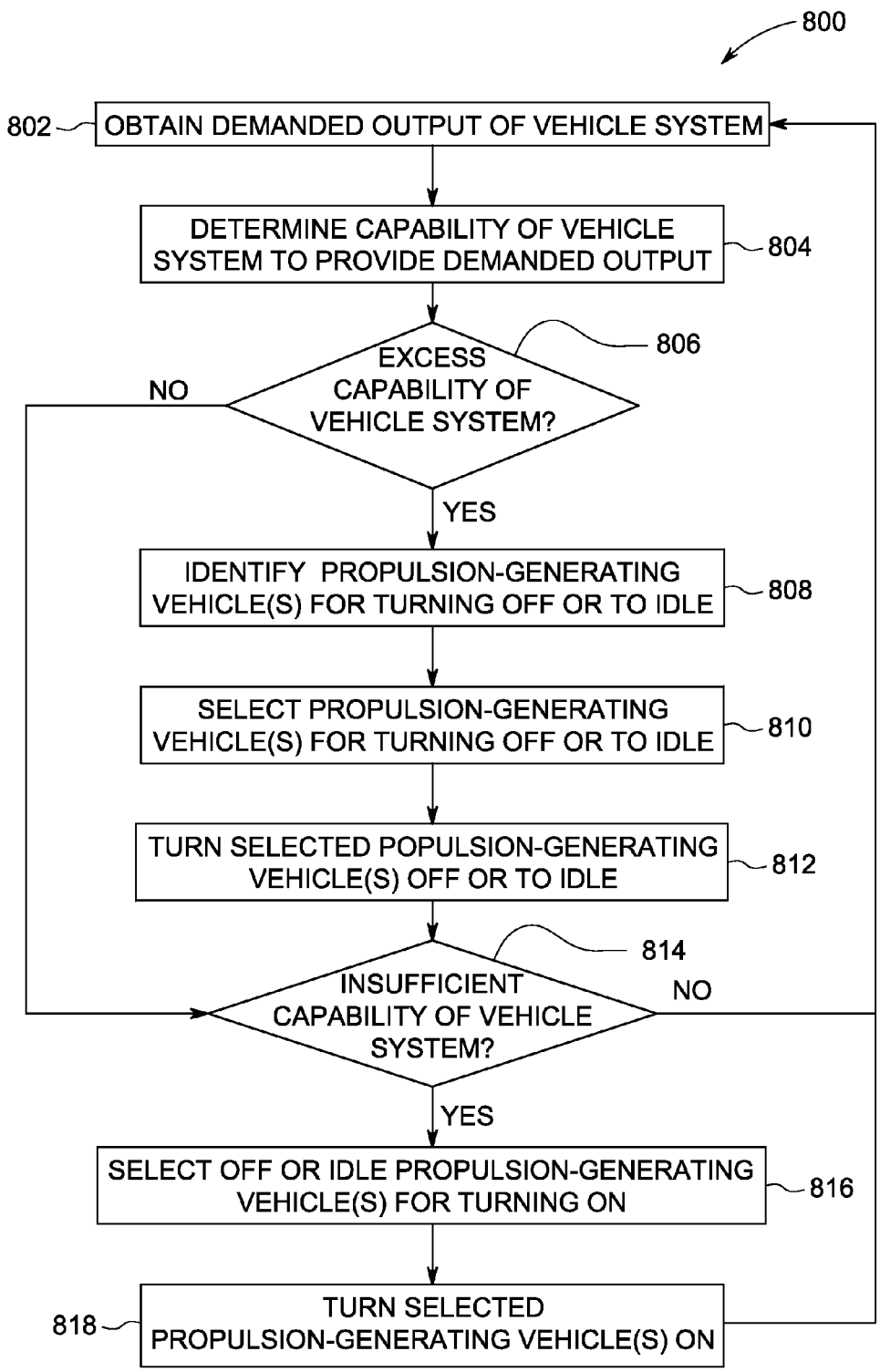
FIG. 8 is a flowchart of an example of a method for controlling a vehicle system.

FIG. 8 is a flowchart of an example of a method 800 for controlling a vehicle system. The method 800 may be used to identify which propulsion-generating units or vehicles in a vehicle system can be turned off or to idle during a trip. The method 800 may be used in conjunction with the control systems described herein. The method 800 may be performed to generate or modify a trip plan prior to a vehicle system embarking on a trip or while the vehicle system is actually traveling along a route in the trip.

At 802, a demanded output of the vehicle system is obtained. The demanded output may be the tractive effort, motive output (e.g., horsepower), speed, braking effort, and the like, that a trip plan designates or requires from the vehicle system in one or more locations along a trip. This demanded output may be a cumulative total of the outputs demanded or designated to be provided from the propulsion-generating vehicles in the vehicle system.

At 804, a capability of the vehicle system to provide the output demanded by (e.g., designated by) the trip plan is determined. For example, the total amount of tractive effort, motive output, and the like, that the propulsion-generating vehicles can provide together can be calculated at one or more of the same locations at which the demanded output is obtained for at 802.

At 806, a determination is made as to whether an excess capability of the vehicle system exists at one or more of the locations along the route for the trip. This excess capability may be identified in locations where the total capability of the vehicle system exceeds or is greater than the demanded output of the trip plan. If an excess capability is identified in one or more locations, then there is the possibility that at least one of the propulsion-generating vehicles in the vehicle system may be able to be turned off or to idle in those same locations while the remaining propulsion-generating vehicles continue to propel the vehicle system. As a result, flow of the method 800 can proceed to 808. Otherwise, if no or relatively little excess capability is identified, the vehicle system may need the output provided by the propulsion-generating vehicles and the propulsion-generating vehicles may not be able to be turned off or to idle. As a result, flow of the method 800 can proceed to 814.

At 808, one or more propulsion-generating vehicles in the vehicle system are identified for being turned off or to idle. The propulsion-generating vehicles that are identified may have individual output capabilities that are no greater than the excess capability identified at 806. For example, if an excess capability of the vehicle system is identified over one segment of the trip as being 4,000 hp, then the individual motive output capabilities of the propulsion-generating vehicles in the vehicle system that are no greater than 4,000 hp may be identified. These individual capabilities may be the largest possible output of respective vehicles, taking into account age, health, weather conditions, and the like, in an embodiment.

At 810, one or more of the propulsion-generated vehicles identified at 808 are selected for being turned off or to idle. The vehicles may be selected so that the sum total of the individual capabilities of the selected vehicles does not exceed the excess capability of the vehicle system in the location of the trip being examined. At 812, the selected propulsion-generating vehicles are turned off or to idle if the vehicle system is approaching the location where the excess capability is identified. Additionally or alternatively, the trip plan may be modified or created so that these selected vehicles are directed to be turned off or to idle at the locations where the excess capability is identified. These vehicles may be turned off or to idle from one of the other propulsion-generating vehicles in the vehicle system and/or using an isolation control system described herein.

At 814, a determination is made as to whether the total capability of the vehicle system having one or more propulsion-generating vehicles that are off or in idle is insufficient for the vehicle system to travel according to the trip plan through one or more of the locations along the route for the trip. This insufficient capability may be identified in locations of the trip where the total capability of the vehicle system is less than the demanded output of the trip plan or is not greater than the demanded output of the trip plan by at least a threshold amount. Additionally or alternatively, an insufficient capability may be identified in locations of the trip where the total capability of the vehicle system (having one or more propulsion-generating vehicles off or in idle) is not enough to propel the vehicle system over or through the locations. For example, in an uphill portion of the trip, a vehicle system with several propulsion-generating vehicles that are off or in idle may not be able to generate enough total motive output to travel over the uphill portion.

If the total capability of the vehicle system with one or more propulsion-generating vehicles that are off or in idle is not enough to meet the designated output or operational settings of the trip plan in a location of the trip (and/or is not enough to propel the vehicle system over the location of the trip), then one or more of the propulsion-generating vehicles that are off or in idle may need to be turned on to provide additional capability (e.g., tractive effort, power output, or the like). As a result, flow of the method 800 may proceed to 816.

On the other hand, if the total capability of the vehicle system with one or more propulsion-generating vehicles that are off or in idle is enough to meet or exceed the designated output or operational settings of the trip plan in a location of the trip (and/or is enough to propel the vehicle system over the location of the trip), then one or more of the propulsion-generating vehicles that are off or in idle may be able to remain off or in idle while the vehicle system travels over the location. The propulsion-generating vehicles that are off or in idle may be able to remain off or in idle. As a result, flow of the method 800 may return to 802, where additional demands of the trip plan are determined.

At 816, one or more propulsion-generating vehicles in the vehicle system that are off or in idle are selected for being turned on for. The propulsion-generating vehicles that are selected may have output capabilities that, when added to the existing capabilities of the vehicle system, are sufficient to increase the total output capability of the vehicle system to at least the output that is designated or required by the trip plan. For example, if the trip plan designates that the vehicle system generate 16,000 hp over a segment of a trip, but the propulsion-generating vehicles that are on when the vehicle system reaches the segment only are capable of providing 8,000 hp, two or more propulsion-generating vehicles that are off or in idle and that are each capable of providing at least 4,000 hp may be selected for being turned on. When added to the output provided by the propulsion-generating vehicles that are on before reaching the segment, the sum total of the outputs of the propulsion-generating vehicles will be at least the output that is designated or required by the trip plan.

At 818, the selected propulsion-generating units are turned on or are designated as being turned on in the trip plan when the vehicle system reaches the locations in the trip. For example, the trip plan may be created or modified to direct the selected propulsion-generating vehicles to turn on when the vehicle system reaches the one or more locations where additional output is needed from the propulsion-generating vehicles.

Figure 9:
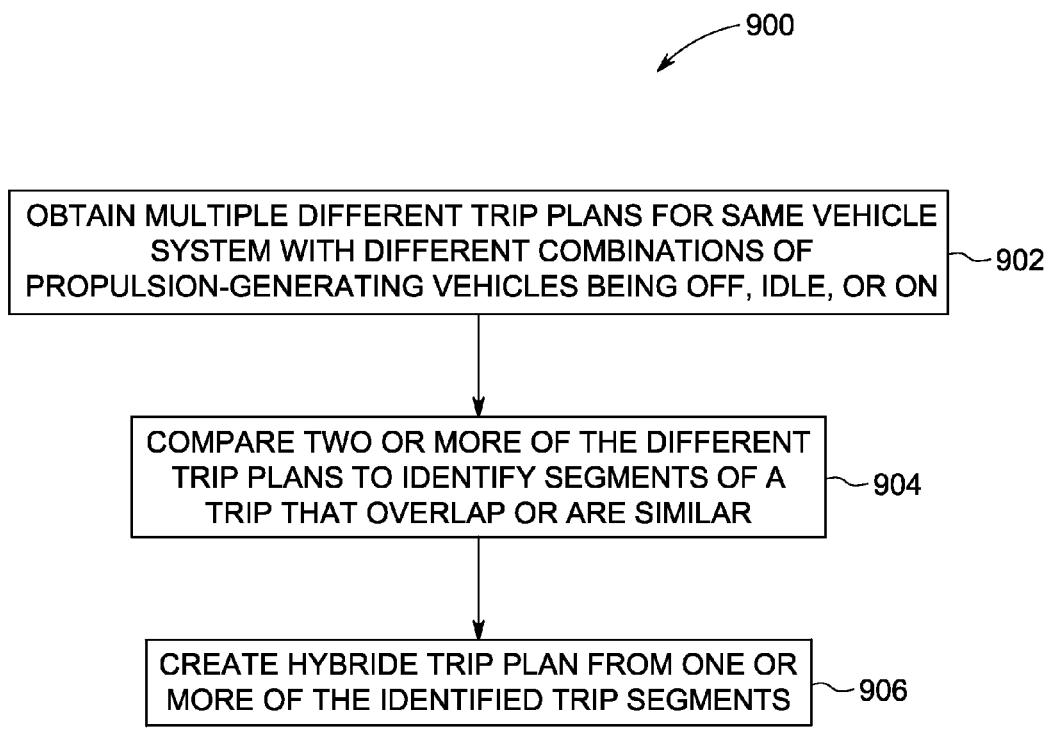
FIG. 9 is a flowchart of an example of a method for controlling a vehicle system.

FIG. 9 is a flowchart of an example of a method 900 for controlling a vehicle system. The method 900 may be used to identify which propulsion-generating units or vehicles in a vehicle system can be turned off or to idle during a trip. The method 900 may be used in conjunction with the control systems described herein. The method 900 may be performed to generate or modify a trip plan prior to a vehicle system embarking on a trip or while the vehicle system is actually traveling along a route in the trip.

At 902, multiple different trip plans are obtained. The different trip plans may designate operational settings (e.g., power outputs, velocities, tractive efforts, throttle settings, brake settings, and the like) of the same vehicle system over the same trip on the same one or more routes. The trip plans can differ from each other in that the trip plans may be created for the vehicle system to travel over the same routes, but with different propulsion-generating vehicles being off, in idle, or on. For example, each trip plan may be associated with the vehicle system having a different combination of the propulsion-generating vehicles being off, in idle, or on for the duration of the trip.

At 904, two or more of the trip plans are compared to each other. The trip plans may be compared in order to identify one or more locations (e.g., segments) of the trip where the operational settings designated by the different trip plans and/or the outputs of the vehicle system are the same or similar. These segments may represent portions of the trip where the two or more trip plans overlap one another. The segments of the different trip plans can overlap one another where the operational settings designated by the different trip plans and/or the outputs of the vehicle systems (e.g., velocities, motive outputs, or the like) are the same or similar (e.g., within a designated range of each other) over the same segment of the trip. These segments may be referred to as identified segments or segments of overlap. The determination of whether the outputs of the vehicle systems are the same or similar may be made based on simulated travel of the vehicle systems according to the trip plans, previous travels of the vehicle systems according to the trip plans, mathematical models of the vehicle systems traveling according to the trip plans, or the like.

At 906, a hybrid trip plan is created from the trip plans that are compared and that do at least partially overlap with each other in one or more segments. For example, the hybrid trip plan may include the designated operational settings of a first trip plan for a first segment of the trip (where the first trip plan designates that all of the propulsion-generating vehicles be on during travel over the first segment), the designated operational settings of a second trip plan for a subsequent second segment of the trip (where the second trip plan designates that one or more of the propulsion-generating vehicles be turned off or in idle during travel over the second segment), the designated operational settings of a third trip plan for a subsequent third segment of the trip (where the third trip plan designates that one or more additional and/or different propulsion-generating vehicles be turned off or in idle during travel over the third segment), and so on.

In an embodiment, a method includes obtaining motive outputs demanded by a trip plan for a vehicle system. The vehicle system includes plural interconnected propulsion-generating vehicles and the trip plan designates operational settings for the vehicle system to operate according to during travel of the vehicle system along one or more routes for a trip. The method also includes determining motive output capabilities of the propulsion-generating vehicles of the vehicle system and identifying one or more segments of the trip where the motive output capabilities of the propulsion-generating vehicles exceed the motive outputs demanded by the trip plan over the one or more segments. The method further includes selecting one or more of the propulsion-generating vehicles for at least one of turning off or for turning to idle during travel in the one or more segments that are identified while one or more remaining propulsion-generating vehicles in the vehicle system remain on to propel the vehicle system through the one or more segments. The one or more propulsion-generating vehicles are selected for turning off or for turning to idle such that a total motive output capability of the one or more remaining propulsion-generating vehicles remains at least as great as the motive outputs demanded by the trip plan over the one or more segments that are identified.

In one aspect, the method also includes modifying the trip plan to designate that the one or more propulsion-generating vehicles that are selected are turned at least one of off or to idle during travel of the vehicle system through the one or more segments that are identified.

In one aspect, the motive output capabilities that are determined represent cumulative power outputs that the propulsion-generating vehicles are capable of generating to propel the vehicle system.

In one aspect, the motive outputs demanded by the trip plan are obtained by determining power outputs generated by the propulsion-generating vehicles when the propulsion-generating vehicles are operated according to the designated operational settings of the trip plan.

In one aspect, the one or more segments are identified when the motive output capabilities of the propulsion-generating vehicles exceed the motive outputs demanded by the trip plan by at least a designated, non-zero threshold.

In one aspect, selecting the one or more propulsion-generating vehicles includes selecting a first subset of the propulsion-generating vehicles for turning off or to idle for travel over a first segment of the trip and selecting a different, second subset of the propulsion-generating vehicles for turning at least one of off or to idle for travel over a different, second segment of the trip. The first and second subsets may be different from each other in that the subsets are not entirely coextensive. For example, the first and second subsets may extend over different portions of the trip, but may at least partially overlap. Alternatively, the first and second subsets may be mutually exclusive and not overlap each other.

In one aspect, the method also includes selecting at least one of the propulsion-generating vehicles that were selected to be turned at least one of off or to idle for travel through the one or more segments of the trip to be turned back on when the vehicle system exits the one or more segments of the trip.

In one aspect, identifying the one or more segments of the trip and selecting the one or more propulsion-generating vehicles for turning at least one of off or to idle occur as the vehicle system travels along the one or more routes during the trip according to the trip plan.

In one aspect, identifying the one or more segments of the trip and selecting the one or more propulsion-generating vehicles for turning at least one of off or to idle occur prior to the vehicle system embarking on the trip.

In one aspect, the trip plan designates the operational settings as a function of at least one of time elapsed during the trip or distance along the one or more routes during the trip such that travel of the vehicle system according to the trip plan causes the vehicle system to at least one of consume less fuel or produce fewer emissions relative to the vehicle system traveling the trip according to a different trip plan that designates different operational settings.

In an embodiment, a control system includes a first unit and a master isolation unit. The first unit is configured to obtain motive outputs demanded by a trip plan for a vehicle system including plural interconnected propulsion-generating vehicles. The trip plan designates operational settings for the vehicle system to operate according to during travel of the vehicle system along one or more routes for a trip. The first unit also is configured to identify one or more segments of the trip where motive output capabilities of the propulsion-generating vehicles exceed the motive outputs demanded by the trip plan and to select one or more of the propulsion-generating vehicles for turning at least one of off or to idle during travel in the one or more segments that are identified. The plural propulsion-generating vehicles of the vehicle system comprise the one or more of the propulsion-generating vehicles that are selected and one or more remaining propulsion-generating vehicles that are not selected. The master isolation unit is configured to receive an isolation command from the first unit that identifies the one or more propulsion-generating vehicles that are selected for being turned at least one of off or to idle during travel in the one or more segments. The master isolation unit also is configured to remotely turn at least one of off or to idle the one or more propulsion-generating vehicles that are identified by the first unit when the vehicle system reaches the one or more segments. The one or more propulsion-generating vehicles are selected by the first unit such that a total motive output capability of the one or more remaining propulsion-generating vehicles remains at least as great as the motive outputs demanded by the trip plan over the one or more segments that are identified.

In one aspect, the first unit is a trip planner unit configured to modify the trip plan to designate that the one or more propulsion-generating vehicles that are selected are turned at least one of off or to idle during travel of the vehicle system through the one or more segments that are identified.

In one aspect, the first unit is configured to select a first subset of the propulsion-generating vehicles for turning at least one of off or to idle for travel over a first segment of the trip and select a different, second subset of the propulsion-generating vehicles for turning at least one of off or to idle for travel over a different, second segment of the trip.

In one aspect, the first unit is configured to communicate an activation command to the master isolation unit and the master isolation unit is configured, responsive to receiving the activation command, to turn on at least one of the propulsion-generating vehicles that were selected to be turned at least one of off or to idle for travel through the one or more segments of the trip when the vehicle system exits the one or more segments of the trip.

In one aspect, the first unit is a regulator unit configured to identify the one or more segments of the trip and select the one or more propulsion-generating vehicles for turning at least one of off or to idle as the vehicle system travels along the one or more routes during the trip according to the trip plan.

In one aspect, the first unit is a trip planner unit configured to identify the one or more segments of the trip and select the one or more propulsion-generating vehicles for turning at least one of off or to idle occur prior to the vehicle system embarking on the trip.

In an embodiment, a method includes obtaining plural different trip plans that designate operational settings of a vehicle system for travel over one or more routes for a trip. The vehicle system includes plural interconnected propulsion-generating vehicles. A first trip plan of the different trip plans directs the propulsion-generating vehicles to be on for the trip and a second trip plan of the different trip plans directing one or more of the propulsion-generating vehicles to be turned at least one of off or to idle for the trip. The method also includes comparing at least the first and second trip plans with each other to identify at least one segment in the trip where the operational settings designated by the first trip plan overlap the operational settings designated by the second trip plan. The method further includes creating a hybrid trip plan from two or more of the different trip plans. The hybrid trip plan includes the designated operational settings of at least one of the first trip plan or the second trip plan in the at least one segment in the trip.

In one aspect, the operational settings designated by the different trip plans are velocities of the vehicle system at different locations along the trip.

In one aspect, the operational settings designated by the first trip plan overlap the operational settings designated by the second trip plan when the operational settings designated by the first and second trip plans are within a designated range of each other.

In one aspect, the operational settings designated by the first trip plan direct the propulsion-generating vehicles to remain on for an entire duration of the trip while the operational settings designated by the second trip plan direct the one or more of the propulsion-generating vehicles to be turned at least one of off or to idle for the entire duration of the trip.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions, numerical values, and types of materials described herein are intended to define the parameters of the inventive subject matter, they are by no means limiting and are exemplary embodiments. Many other embodiments will be apparent to persons of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The methods described herein may be performed using one or more tangible and non-transitory components, such as one or more processors, controllers, computers, or other devices. The operations described in connection with the methods may be directed by one or more sets of instructions stored on a tangible and non-transitory computer readable medium. For example, software code stored on a tangible and non-transitory memory may be used to direct one or more processors to carry out the operations of the methods.

This written description uses examples to disclose several embodiments of the inventive subject matter and also to enable a person of ordinary skill in the art to practice the embodiments of inventive subject matter, including making and using any devices or systems and performing any incorporated methods. The patentable scope of the inventive subject matter is defined by the claims, and may include other examples that occur to persons of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
obtaining motive outputs demanded by a trip plan for a vehicle system, the vehicle system including plural interconnected propulsion-generating vehicles, the trip plan designating operational settings for the vehicle system to operate during travel of the vehicle system along one or more routes for a trip;
determining motive output capabilities of the propulsion-generating vehicles of the vehicle system;
identifying one or more segments of the trip where the motive output capabilities of the propulsion-generating vehicles exceed the motive outputs demanded by the trip plan over the one or more segments; and selecting one or more of the propulsion-generating vehicles for at least one of turning off or for turning to idle during travel in the one or more segments that are identified while one or more remaining propulsion-generating vehicles in the vehicle system remain on to propel the vehicle system through the one or more segments, wherein the one or more propulsion-generating vehicles for turning off or for turning to idle are selected such that a total motive output capability of the one or more remaining propulsion-generating vehicles remains at least as great as the motive outputs demanded by the trip plan over the one or more segments that are identified, wherein the one or more segments are identified responsive to the motive output capabilities of the propulsion-generating vehicles exceeding the motive outputs demanded by the trip plan by at least a designated, non-zero threshold.

2. The method of claim 1, further comprising modifying the trip plan to designate that the one or more propulsion-generating vehicles that are selected are turned at least one of off or to idle during travel of the vehicle system through the one or more segments that are identified.

3. The method of claim 1, wherein the motive output capabilities that are determined represent cumulative power outputs that the propulsion-generating vehicles are capable of generating to propel the vehicle system.

4. The method of claim 1, wherein the motive outputs demanded by the trip plan are obtained by determining power outputs generated by the propulsion-generating vehicles when the propulsion-generating vehicles are operated according to the designated operational settings of the trip plan.

5. The method of claim 1, wherein selecting the one or more propulsion-generating vehicles includes selecting a first subset of the propulsion-generating vehicles for turning off or to idle for travel over a first segment of the trip and selecting a different, second subset of the propulsion-generating vehicles for turning at least one of off or to idle for travel over a different, second segment of the trip.

6. The method of claim 1, further comprising selecting at least one of the propulsion-generating vehicles that were selected to be turned at least one of off or to idle for travel through the one or more segments of the trip to be turned back on responsive to the vehicle system exiting the one or more segments of the trip.

7. The method of claim 1, wherein identifying the one or more segments of the trip and selecting the one or more propulsion-generating vehicles for turning at least one of off or to idle occur as the vehicle system travels along the one or more routes during the trip according to the trip plan.

8. The method of claim 1, wherein identifying the one or more segments of the trip and selecting the one or more propulsion-generating vehicles for turning at least one of off or to idle occur prior to the vehicle system embarking on the trip.

9. The method of claim 1, wherein the trip plan designates the operational settings as a function of at least one of time elapsed during the trip or distance along the one or more routes during the trip such that travel of the vehicle system according to the trip plan causes the vehicle system to at least one of consume less fuel or produce fewer emissions relative to the vehicle system traveling the trip according to a different trip plan that designates different operational settings.

10. A control system comprising:

a first unit configured to obtain motive outputs demanded by a trip plan for a vehicle system including plural interconnected propulsion-generating vehicles, the trip plan designating operational settings for the vehicle system to operate during travel of the vehicle system along one or more routes for a trip, the first unit also configured to identify one or more segments of the trip where motive output capabilities of the propulsion-generating vehicles exceed the motive outputs demanded by the trip plan and to select one or more of the propulsion-generating vehicles for at least one of turning off or to idle during travel in the one or more segments that are identified, wherein the plural propulsion-generating vehicles of the vehicle system comprise the one or more of the propulsion-generating vehicles that are selected and one or more remaining propulsion-generating vehicles that are not selected, wherein the first unit also is configured to generate an isolation command representative of the one or more of the propulsion-generating vehicles that are selected, wherein the one or more segments are identified by the first unit responsive to the motive output capabilities of the propulsion-generating vehicles exceeding the motive outputs demanded by the trip plan by at least a designated, non-zero threshold; and a master isolation unit configured to receive the isolation command from the first unit that identifies the one or more propulsion-generating vehicles that are selected for being turned off or to idle during travel in the one or more segments, the master isolation unit also configured to remotely turn off or to idle the one or more propulsion-generating vehicles that are identified by the first unit when the vehicle system reaches the one or more segments, wherein the one or more propulsion-generating vehicles are selected by the first unit such that a total motive output capability of the one or more remaining propulsion-generating vehicles remains at least as great as the motive outputs demanded by the trip plan over the one or more segments that are identified.

11. The control system of claim 10, wherein the first unit is a trip planner unit configured to modify the trip plan to designate that the one or more propulsion-generating vehicles that are selected are turned at least one of off or to idle during travel of the vehicle system through the one or more segments that are identified.

12. The control system of claim 10, wherein the first unit is configured to select a first subset of the propulsion-generating vehicles for turning at least one of off or to idle for travel over a first segment of the trip and select a different, second subset of the propulsion-generating vehicles for turning at least one of off or to idle for travel over a different, second segment of the trip.

13. The control system of claim 10, wherein the first unit is configured to communicate an activation command to the master isolation unit and the master isolation unit is configured, responsive to receiving the activation command, to turn on at least one of the propulsion-generating vehicles that were selected to be turned at least one of off or to idle for travel through the one or more segments of the trip responsive to the vehicle system exiting the one or more segments of the trip.

14. The control system of claim 10, wherein the first unit is a regulator unit configured to identify the one or more segments of the trip and select the one or more propulsion-generating vehicles for turning at least one of off or to idle as the vehicle system travels along the one or more routes during the trip according to the trip plan.

15. The control system of claim 10, wherein the first unit is a trip planner unit configured to identify the one or more segments of the trip and select the one or more propulsion-generating vehicles for turning at least one of off or to idle prior to the vehicle system embarking on the trip.

16. A method comprising:
obtaining plural different trip plans that designate operational settings of a vehicle system for travel over one or more routes for a trip, the vehicle system including plural interconnected propulsion-generating vehicles, a first trip plan of the different trip plans directing the propulsion-generating vehicles to be on for the trip and a second trip plan of the different trip plans directing one or more of the propulsion-generating vehicles to be at least one of turned off or to idle for the trip;
comparing at least the first and second trip plans with each other to identify at least one segment in the trip where the operational settings designated by the first trip plan overlap the operational settings designated by the second trip plan; and
creating a hybrid trip plan from two or more of the different trip plans, the hybrid trip plan including the designated operational settings of at least one of the first trip plan or the second trip plan in the at least one segment in the trip.

17. The method of claim 16, wherein the operational settings designated by the different trip plans are velocities of the vehicle system at different locations along the trip.

18. The method of claim 16, wherein the operational settings designated by the first trip plan overlap the operational settings designated by the second trip plan responsive to the operational settings designated by the first and second trip plans being within a designated range of each other.

19. The method of claim 16, wherein the operational settings designated by the first trip plan direct the propulsion-generating vehicles to remain on for an entire duration of the trip while the operational settings designated by the second trip plan direct the one or more of the propulsion-generating vehicles to be at least one of turned off or to idle for the entire duration of the trip.

20. A method comprising:
obtaining motive outputs demanded by a trip plan for a vehicle system, the vehicle system including plural interconnected propulsion-generating vehicles, the trip plan designating operational settings for the vehicle system to operate during travel of the vehicle system along one or more routes for a trip;
determining motive output capabilities of the propulsion-generating vehicles of the vehicle system;
identifying one or more segments of the trip where the motive output capabilities of the propulsion-generating vehicles exceed the motive outputs demanded by the trip plan over the one or more segments; and
selecting one or more of the propulsion-generating vehicles for at least one of turning off or for turning to idle during travel in the one or more segments that are identified while one or more remaining propulsion-generating vehicles in the vehicle system remain on to propel the vehicle system through the one or more segments, wherein the one or more propulsion-generating vehicles for turning off or for turning to idle are selected such that a total motive output capability of the one or more remaining propulsion-generating vehicles remains at least as great as the motive outputs demanded by the trip plan over the one or more segments that are identified,
wherein identifying the one or more segments of the trip and selecting the one or more propulsion-generating vehicles for turning at least one of off or to idle occur as the vehicle system travels along the one or more routes during the trip according to the trip plan.

21. A method comprising:
obtaining motive outputs demanded by a trip plan for a vehicle system, the vehicle system including plural interconnected propulsion-generating vehicles, the trip plan designating operational settings for the vehicle system to operate during travel of the vehicle system along one or more routes for a trip;
determining motive output capabilities of the propulsion-generating vehicles of the vehicle system;
identifying one or more segments of the trip where the motive output capabilities of the propulsion-generating vehicles exceed the motive outputs demanded by the trip plan over the one or more segments; and
selecting one or more of the propulsion-generating vehicles for at least one of turning off or for turning to idle during travel in the one or more segments that are identified while one or more remaining propulsion-generating vehicles in the vehicle system remain on to propel the vehicle system through the one or more segments, wherein the one or more propulsion-generating vehicles for turning off or for turning to idle are selected such that a total motive output capability of the one or more remaining propulsion-generating vehicles remains at least as great as the motive outputs demanded by the trip plan over the one or more segments that are identified,
wherein the trip plan designates the operational settings as a function of at least one of time elapsed during the trip or distance along the one or more routes during the trip such that travel of the vehicle system according to the trip plan causes the vehicle system to at least one of consume less fuel or produce fewer emissions relative to the vehicle system traveling the trip according to a different trip plan that designates different operational settings.

* * * * *